US007844734B2

(12) United States Patent
Jiang et al.

(10) Patent No.: US 7,844,734 B2
(45) Date of Patent: Nov. 30, 2010

(54) DYNAMIC ADDRESSING (DA) USING A CENTRALIZED DA MANAGER

(75) Inventors: James Jiang, Alviso, CA (US); De Ji, Alviso, CA (US); Anumele Raja, Alviso, CA (US)

(73) Assignee: InnoPath Software, Inc., Sunnyvale, CA (US)

( * ) Notice: Subject to any disclaimer, the term of this patent is extended or adjusted under 35 U.S.C. 154(b) by 995 days.

(21) Appl. No.: 11/048,511

(22) Filed: Feb. 1, 2005

(65) Prior Publication Data

US 2005/0216537 A1   Sep. 29, 2005

Related U.S. Application Data

(63) Continuation-in-part of application No. 10/971,179, filed on Oct. 22, 2004, which is a continuation-in-part of application No. 10/298,458, filed on Nov. 18, 2002, now Pat. No. 7,007,049.

(60) Provisional application No. 60/513,764, filed on Oct. 23, 2003, provisional application No. 60/541,025, filed on Feb. 2, 2004.

(51) Int. Cl.
*G06F 15/16* (2006.01)
(52) U.S. Cl. .................................................. 709/245
(58) Field of Classification Search ................ 707/205; 709/245; 717/102; 719/331
See application file for complete search history.

(56) References Cited

U.S. PATENT DOCUMENTS

| 4,875,159 A | | 10/1989 | Cary | |
|---|---|---|---|---|
| 5,093,914 A | * | 3/1992 | Coplien et al. | 717/129 |
| 5,175,828 A | * | 12/1992 | Hall et al. | 719/331 |
| 5,359,721 A | * | 10/1994 | Kempf et al. | 719/331 |
| 5,444,764 A | | 8/1995 | Galecki | |
| 5,479,654 A | | 12/1995 | Squibb | |
| 5,481,713 A | * | 1/1996 | Wetmore et al. | 717/170 |
| 5,495,612 A | * | 2/1996 | Hirayama et al. | 719/331 |
| 5,574,906 A | | 11/1996 | Morris | |
| 5,590,329 A | * | 12/1996 | Goodnow et al. | 717/144 |

(Continued)

OTHER PUBLICATIONS

Hauptmann, Steffen et al., "On-line maintenance with on-the-fly software replacement", Configurable Distributed Systems, Proceedings, Third IEEE International Conference, May 6, 1996, pp. 80-80.

(Continued)

*Primary Examiner*—John Follansbee
*Assistant Examiner*—Imad Hussain
(74) *Attorney, Agent, or Firm*—Gregory & Martensen LLP

(57) ABSTRACT

Dynamic Addressing (DA) is provided that uses a Centralized DA Manager to manage function calls, global variable, and constant variable references among components of software code. The DA Manager is generated during the process of linking the components and is loaded along with the code into client device memory. References from one component to another are stored in the DA Manager along with the address of each component. In an embodiment, the DA Manager includes linker-defined symbols stored in fixed addresses, such that the linker-defined symbols consistently provide the current address for data requested from another component. Changes to a component during file upgrades that result in location changes of the component in memory are recorded by the DA Manager, thereby maintaining the integrity of references to the component present in the code.

49 Claims, 13 Drawing Sheets

U.S. PATENT DOCUMENTS

| | | | | |
|---|---|---|---|---|
| 5,615,400 | A * | 3/1997 | Cowsar et al. | 719/332 |
| 5,634,052 | A | 5/1997 | Morris | |
| 5,729,735 | A | 3/1998 | Meyering | |
| 5,742,905 | A | 4/1998 | Pepe | |
| 5,758,062 | A | 5/1998 | McMahon | |
| 5,764,989 | A * | 6/1998 | Gustafsson et al. | 717/129 |
| 5,806,078 | A | 9/1998 | Hug | |
| 5,813,017 | A | 9/1998 | Morris | |
| 5,832,520 | A | 11/1998 | Miller | |
| 5,835,749 | A * | 11/1998 | Cobb | 719/331 |
| 5,850,565 | A | 12/1998 | Wightman | |
| 5,864,757 | A | 1/1999 | Parker | |
| 5,893,119 | A | 4/1999 | Squibb | |
| 5,916,308 | A * | 6/1999 | Duncan et al. | 719/331 |
| 5,923,882 | A * | 7/1999 | Ho et al. | 717/147 |
| 5,991,541 | A * | 11/1999 | Ozalp | 717/164 |
| 6,018,747 | A | 1/2000 | Burn | |
| 6,021,272 | A * | 2/2000 | Cahill et al. | 717/147 |
| 6,041,333 | A | 3/2000 | Bretschneider | |
| 6,052,531 | A | 4/2000 | Waldin | |
| 6,076,148 | A | 6/2000 | Kedem | |
| 6,078,967 | A | 6/2000 | Fulghum | |
| 6,088,694 | A | 7/2000 | Burns | |
| 6,128,629 | A | 10/2000 | Bretschneider | |
| 6,145,012 | A | 11/2000 | Small | |
| 6,154,878 | A * | 11/2000 | Saboff | 717/173 |
| 6,163,811 | A | 12/2000 | Porter | |
| 6,167,258 | A | 12/2000 | Schmidt | |
| 6,212,632 | B1 * | 4/2001 | Surine et al. | 713/2 |
| 6,216,175 | B1 | 4/2001 | Sliger | |
| 6,226,784 | B1 | 5/2001 | Holmes | |
| 6,233,589 | B1 | 5/2001 | Balcha | |
| 6,269,456 | B1 | 7/2001 | Hodges | |
| 6,327,671 | B1 | 12/2001 | Menon | |
| 6,345,306 | B1 * | 2/2002 | Hintermeister et al. | 709/245 |
| 6,349,311 | B1 | 2/2002 | Sobel | |
| 6,374,250 | B2 | 4/2002 | Ajtai | |
| 6,401,239 | B1 | 6/2002 | Miron | |
| 6,411,227 | B1 | 6/2002 | Fish | |
| 6,442,660 | B1 | 8/2002 | Henerlau | |
| 6,457,175 | B1 | 9/2002 | Lerche | |
| 6,466,999 | B1 | 10/2002 | Sliger | |
| 6,470,329 | B1 | 10/2002 | Livschitz | |
| 6,526,574 | B1 | 2/2003 | Jones | |
| 6,535,894 | B1 | 3/2003 | Schmidt | |
| 6,542,906 | B2 | 4/2003 | Korn | |
| 6,594,822 | B1 | 7/2003 | Schweitz | |
| 6,615,404 | B1 | 9/2003 | Garfunkel | |
| 6,629,110 | B2 | 9/2003 | Cane | |
| 6,651,061 | B2 | 11/2003 | Unchida | |
| 6,651,190 | B1 | 11/2003 | Worley | |
| 6,662,163 | B1 | 12/2003 | Albayrak | |
| 6,671,703 | B2 | 12/2003 | Thompson | |
| 6,671,746 | B1 * | 12/2003 | Northrup | 719/331 |
| 6,671,757 | B1 | 12/2003 | Multer | |
| 6,694,336 | B1 | 2/2004 | Multer | |
| 6,701,315 | B1 | 3/2004 | Austin | |
| 6,754,816 | B1 | 6/2004 | Layton | |
| 6,785,786 | B1 | 8/2004 | Gold | |
| 6,789,157 | B1 * | 9/2004 | Lilja et al. | 711/103 |
| 6,836,657 | B2 | 12/2004 | Ji | |
| 6,892,381 | B2 | 5/2005 | Kim | |
| 6,898,564 | B1 | 5/2005 | Odhner | |
| 6,912,591 | B2 | 6/2005 | Lash | |
| 6,925,467 | B2 | 8/2005 | Gu | |
| 6,954,765 | B2 | 10/2005 | Spiegel | |
| 7,065,754 | B1 * | 6/2006 | Coutant et al. | 717/146 |
| 7,143,421 | B2 * | 11/2006 | Forin et al. | 719/331 |
| 7,213,247 | B1 * | 5/2007 | Wilner et | 718/100 |
| 7,506,316 | B2 * | 3/2009 | Vertes | 717/130 |
| 2001/0029178 | A1 | 10/2001 | Criss | |
| 2001/0049263 | A1 | 12/2001 | Zhang | |
| 2002/0062405 | A1 * | 5/2002 | Ayyagari | 709/331 |
| 2002/0087956 | A1 * | 7/2002 | Darlet | 717/159 |
| 2002/0099726 | A1 | 7/2002 | Crudele | |
| 2002/0120697 | A1 | 8/2002 | Generous | |
| 2002/0129107 | A1 | 9/2002 | Loughran | |
| 2003/0023964 | A1 * | 1/2003 | Rajaram et al. | 717/172 |
| 2003/0033441 | A1 * | 2/2003 | Forin et al. | 709/315 |
| 2003/0066064 | A1 * | 4/2003 | Rajaram | 717/173 |
| 2003/0074656 | A1 * | 4/2003 | Irino | 717/162 |
| 2003/0101431 | A1 * | 5/2003 | Duesterwald et al. | 717/111 |
| 2003/0110253 | A1 | 6/2003 | Anuszczyk | |
| 2003/0163508 | A1 * | 8/2003 | Goodman | 709/100 |
| 2003/0200207 | A1 | 10/2003 | Dickinson | |
| 2003/0212712 | A1 | 11/2003 | Gu | |
| 2003/0220944 | A1 | 11/2003 | Schottland | |
| 2003/0229890 | A1 * | 12/2003 | Lau et al. | 717/168 |
| 2004/0031027 | A1 | 2/2004 | Hiltgen | |
| 2004/0062130 | A1 | 4/2004 | Chiang | |
| 2004/0073582 | A1 | 4/2004 | Spiegel | |
| 2004/0092255 | A1 | 5/2004 | Ji | |
| 2004/0098361 | A1 | 5/2004 | Peng | |
| 2004/0098413 | A1 | 5/2004 | Peng | |
| 2004/0098420 | A1 | 5/2004 | Peng | |
| 2004/0098421 | A1 | 5/2004 | Peng | |
| 2004/0098427 | A1 | 5/2004 | Peng | |
| 2004/0111427 | A1 | 6/2004 | Gu | |
| 2004/0111484 | A1 | 6/2004 | Young | |
| 2004/0193643 | A1 | 9/2004 | O'Brien | |
| 2004/0220980 | A1 | 11/2004 | Forster | |
| 2004/0225996 | A1 | 11/2004 | Venkatesan | |
| 2004/0260923 | A1 | 12/2004 | Nakai | |
| 2005/0010576 | A1 | 1/2005 | Ren | |
| 2005/0010870 | A1 | 1/2005 | Gu | |
| 2005/0060163 | A1 | 3/2005 | Barsness | |
| 2005/0091288 | A1 | 4/2005 | Ji | |
| 2005/0102318 | A1 | 5/2005 | Odhner | |
| 2005/0216537 | A1 * | 9/2005 | Jiang et al. | 707/205 |
| 2005/0234997 | A1 | 10/2005 | Gu | |

OTHER PUBLICATIONS

Chakravorty et al., "Architecture and implementation of a remote management framework for dynamically reconfigurable devices", Networks, 2002. ICON 2002. 10th IEEE International Conference, Aug. 27, 2002, pp. 375-380.

Lyu et al., "A procedure0based dynamic software update", Dependable Systems and Networks, 2001. Proceedings, The International Conference, Jul. 1, 2001. pp. 271-280.

Bialek, R. P., "The architecture of a dynamically updatable, component-based system", Computer Software and Application Conference, 2002. COMPSAC 2002. Proceedings, 26th Annual International, Sugust 26, 2002, pp. 1012-1016.

Gumbold, M., "Software distribution by reliable multicast", Local Computer Networks, 1996. Proceedings, 21st IEEE Conference, Oct. 13, 1996, pp. 222-231.

Tichy, Walter F., "The string-to-string correction problem with block moves", ACM Transaction on Computer Systems, vol. 2, No. 4, Nov. 1984, pp. 309-321.

Ajtai, Miklos et al., "Compactly encoding unstructured inputs with differential compression", IBM Almaden Research Center; 44 pages.

Burns, Randal C. et al., "In-place reconstruction of delta compressed files", IBM Almaden Research Center, 9 pages.

Burns, Randal et al., "In-place reconstruction of version differences", IBM Almaden Research Center, 25 pages.

Liv, Jacob et al., "A universal algorithm for sequential data compression", IEEE Transactions on Information Theory, vol. IT-23, No. 3, May 1977.

* cited by examiner

DYNAMIC ADDRESSING (DA) USING A CENTRALIZED DA MANAGER

RELATED APPLICATIONS

This application claims the benefit of U.S. Patent Application No. 60/541,025, filed Feb. 2, 2004. This application is also a continuation-in-part of U.S. patent application Ser. No. 10/971,179, filed Oct. 22, 2004, which a continuation-in-part application of U.S. patent application Ser. No. 10/298,458, filed Nov. 18, 2002 now U.S. Pat. No. 7,007,049 and claims the benefit of U.S. Patent Application No. 60/513,764, filed Oct. 23, 2003.

This application is related to U.S. patent application Ser. No. 10/146,545, filed May 13, 2002, application Ser. No. 10/261,153, filed Sep. 30, 2002, application Ser. No. 10/292,245, filed Nov. 12, 2002, application Ser. No. 10/298,393, filed Nov. 18, 2002, application Ser. No. 10/616,615, filed Jul. 9, 2003, all of which are currently pending.

TECHNICAL FIELD

The disclosed embodiments relate to memory management while upgrading and maintaining electronic files.

BACKGROUND

Software is hosted or running on most electronic devices and includes one or more files in the form of human-readable American Standard Code for Information Interchange ("ASCII") plain text files or binary code. The hosted software, which runs on a processor or central processing unit ("CPU"), provides functionality in a host device but often changes over time. The software changes may result from the need to correct bugs, or errors, in the software files, adapt to evolving technologies, or add new features and functions. In particular, embedded software components hosted on mobile wireless devices often include numerous software bugs that require correction.

The software or programs of a device include software files divided into smaller units that are often referred to as modules or components. In mobile wireless devices, a real-time operating system ("RTOS") is typically used in which the hosted software modules or components of the device are linked as a single large file. This large software file is loaded, or embedded, into the device, and is typically stored in the read-only-memory ("ROM") or flash ROM of the wireless device.

The hosted software files of a wireless device can be updated to correct errors or add new functions using a wireless communication link or over-the-air ("OTA") link like a radio link. Because of bandwidth, memory and other constraints relating to the wireless device, updating the hosted software after the device has been commercially released requires special proprietary applications. An example of these proprietary applications includes the upgrade or update applications referred to as DeltaUpdate™ and DeltaRewrite™ available from InnoPath Software, Inc. of Alviso, Calif. These upgrade applications are also the subject of the Related Applications.

Programs for the wireless devices are typically stored in device memory using a method referred to as static addressing. After a program has been written, it is compiled into computer-readable code during which the different modules or components of code are linked. This results in what is known as an image or memory image, where an image is an executable set of instructions in machine language stored in the ROM of the host device. These programs are typically organized into a continuous stream of instructions, some of which have references to instructions in other parts of the host device ROM. Because of this sequential and interconnecting architecture, the location of specific machine code within the host device ROM is largely fixed, thus the terminology "static addressing".

Upgrading one part of the code of a host device using files received via an OTA link, even if the change is small, involves rewriting a large part of the host device ROM in order to re-sequence and adjust the references in the code. This makes the typical updating process tedious, error-prone, and time-consuming. Consequently, there is a need for Dynamic Addressing for use in upgrading software applications hosted on wireless devices like cellular telephones and other mobile communication devices, personal digital assistants ("PDAs"), and personal computers.

Figure 1:
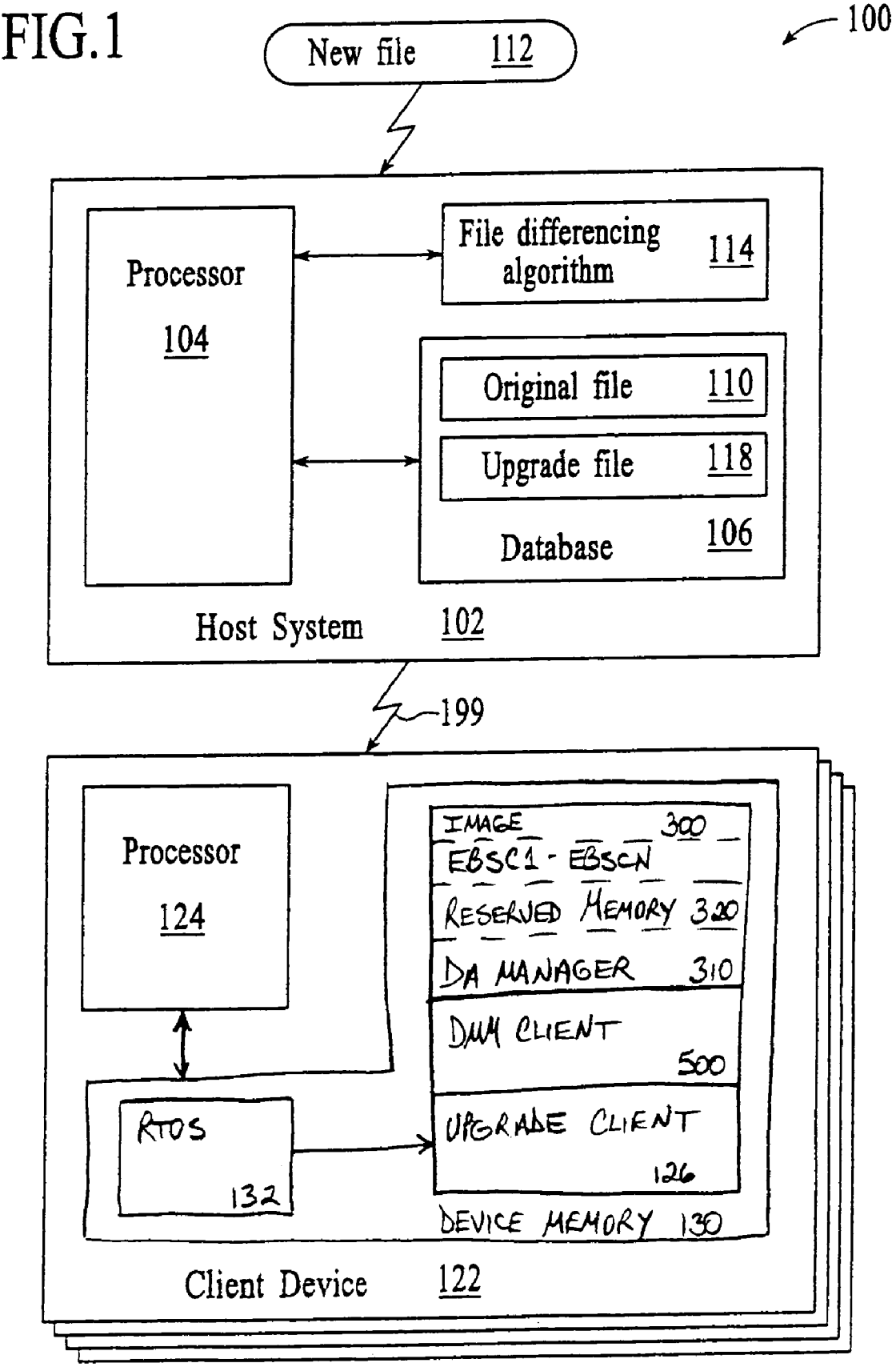
FIG. 1 is a block diagram of a system including client devices with a Dynamic Addressing ("DA") Manager, under an embodiment.

In the drawings, the same reference numbers identify identical or substantially similar elements or acts. To easily identify the discussion of any particular element or act, the most significant digit or digits in a reference number refer to the Figure number in which that element is first introduced (e.g., element 126 is first introduced and discussed with respect to FIG. 1).

DETAILED DESCRIPTION

Dynamic Addressing for use in the update of software hosted on wireless handsets and similar client devices is described herein. The DA of an embodiment includes organizing code stored in a device memory into groups of related components, also referred to herein as embedded software components ("EBSCs"). Components are associated with each other by identifying and storing any references from one component to another component in a centralized and separate program referred to herein as the "DA Manager", or the "Centralized DA Manager", along with the location or address of each component. The DA Manager is generated during the process of linking the EBSCs and is loaded along with the client device programs into the client device memory.

In operation the DA Manager generally functions as a centralized router or switchboard that knows the symbol location of each EBSC of the client device and links EBSCs as required during the execution of the client device programs. Any reference from one EBSC to another EBSC is routed via the DA Manager instead of directly between the EBSCs. Therefore, if a component is modified during a file upgrade and the upgrade results in a location change of the EBSC in client device memory, this change is recorded by the DA Manager, thus maintaining the integrity of references or linkages to the EBSC present in the client device programs.

Consequently the DA Manager provides an efficient and logical manner in which to organize the machine code in client device memory. The DA Manager of an embodiment allows for additions, deletions and modifications to one or more portions (EBSCs) of the machine code without rippling through and affecting the rest of the code stored in client device memory. In contrast, when using static addressing where a change is made to a program stored in memory that includes the addition of several new lines of code, all code following the changed code is shifted down in the memory layout. This shifting of the code necessitates a change to any references or linkages present in the changed code. Thus a small program change can result in corresponding and compensating changes in much of the machine code that is stored in the client device memory.

The DA avoids the problems associated with static addressing because changes to an EBSC address need only be made once in the DA Manager, rather than throughout all of the client device programs. Since re-addressing is more efficient, the area of the client device memory allocated to specific blocks can also be reduced, resulting in a greater utilization of the available memory of the client device. And by limiting the rewriting of address changes to just the DA Manager, debugging, modifying and otherwise upgrading the client device software is accomplished in a much shorter time. This results in greater efficiency and accuracy, and significantly reduces costs and lost revenue. It also provides for larger and more complex software downloads and updates than are possible with typical static addressing.

In the following description, numerous specific details are introduced to provide a thorough understanding of, and enabling description for, embodiments of the DA and DA Manager. One skilled in the relevant art, however, will recognize that the DA and DA Manager can be practiced without one or more of the specific details, or with other components, systems, etc. In other instances, well-known structures or operations are not shown, or are not described in detail, to avoid obscuring aspects of the DA and DA Manager.

FIG. 1 is a block diagram of a system 100 including client devices with a DA Manager, under an embodiment. The system 100 of an embodiment is a file upgrade system 100, but is not so limited. Generally, the file upgrade system 100 includes a first computer system 102, or host system, and one or more second computer systems including client devices or computers 122. The host system 102 and the client devices 122 each include at least one processor 104 and 124, respectively, operating under program control, but are not so limited. The host system 102 and the client devices 122 communicate via a communication path 199. These computer systems 102 and 122 include any collection of computing devices operating together, as is known in the art. The computer systems 102 and 122 can also include components within a larger computer system.

The processor 104 of the host system 102 couples among a database 106 and a file differencing algorithm 114, under program control. Alternatively, various other components of the host system 102 can couple among the processor 104, the database 106, and the file differencing algorithm 114 and provide file updating functions under program control. While one processor 104, one database 106, and one file differencing algorithm 114 are shown, various alternative embodiments include any number and/or type of each of these components coupled in various configurations contemplated by one skilled in the art. Further, while the processor 104, database 106, and file differencing algorithm 114 are shown as separate blocks, some or all of these blocks can be monolithically integrated onto a single chip, distributed among a number of chips or components of a host system, and/or provided by some combination of algorithms. The file differencing algorithm 114 can be implemented in software algorithm(s), firmware, hardware, and any combination of software, firmware, and hardware. The term "processor" as generally used herein refers to any logic processing unit, such as one or more CPUs, digital signal processors ("DSPs"), application-specific integrated circuits ("ASIC"), etc.

Likewise, the client devices 122 of an embodiment include a processor 124 coupled among a device memory 130, under program control. The device memory 130 includes a RTOS 132 (also referred to herein as a "main program 132"), one or more images 300, a Device Memory Manager ("DMM") client 500 ("DMM client"), and an upgrade client 126. The images 300, also referred to herein as software images or binary images, are executable files, and include one or more embedded software components ("EBSCs") EBSC1-EBSCN, reserved memory areas 320, and a Centralized DA Manager 310, also referred to herein as a "DA Manager 310". A binary image can generally be composed via link time operations by different components. A software component like the EBSC is an independently built binary image with functions that are specially grouped together by design. While the DA Manager 310 is shown as a component of the image 300, the DA Manager can be a component of the DMM client 500, the upgrade client 126, and/or any other component of the client device 122.

Alternatively, various other components of the client device 122 can couple among the processor 124 and the device memory 130 and provide file updating functions under program control. While one processor 124 and one device memory 130 are shown, various alternative embodiments include any number and/or type of each of these components coupled in various configurations contemplated by one skilled in the art. Further, while the processor 124 and device memory 130 are shown as separate blocks, some or all of these blocks can be monolithically integrated onto a single chip, distributed among a number of chips or components of a host system, and/or provided by some combination of algorithms. The algorithm or applications of the device memory 130 can be implemented in software algorithm(s), firmware, hardware, and any combination of software, firmware, and hardware. The device memory can include any number and/or combination of memory types including ROM and random access memory ("RAM"), but is not so limited.

The communication path 199 includes any medium for communicating or transferring files among the computer systems 102 and 122. Therefore, this path 199 includes wireless connections, wired connections, and hybrid wireless/wired connections. The communication path 199 also includes couplings or connections to networks including local area networks ("LANs"), metropolitan area networks ("MANs"), wide area networks ("WANs"), proprietary networks, inter-office or backend networks, and the Internet. Furthermore, the communication path 199 includes removable fixed mediums like floppy disks, hard disk drives, and CD-ROM disks, as well as flash memory, Universal Serial Bus ("USB") connections, RS-232 connections, telephone lines, buses, and electronic mail messages.

The host system 102 and the client devices 122 each include an original version 110 of an electronic file, referred to herein as the original file 110 or the old file. The host system 102 stores the original file 110 in a database 106 or other memory area or combination of memory areas or devices, but is not so limited. The client devices 122 store the original file in device memory 130 for use in operation.

At such time as a software provider upgrades the original file 110, for example to provide additional functionality or to fix a software bug, a new version 112 of the electronic file is generated. The new version 112 of the electronic file is referred to herein as the new file 112. The new file 112 is generally an updated or revised version of the original file 110, but is not so limited. The software provider transfers the new file 112 to the host system 102.

The electronic files 110 and 112 include software files including dynamic link library files, shared object files, EBSCs, firmware files, executable files, data files including hex data files, system configuration files, and files including personal use data, but are not so limited. Since any type of file can be regarded as a byte stream, hereafter a file can be described as a byte stream.

Components of the host system 102 including at least one processor 104 receive and process the new file 112 in order to generate upgrade information for use in upgrading the original files hosted on the client devices 122. In an embodiment, the processor 104 generates an upgrade file 118 for use in transferring information of the upgrades to the client devices 122. The upgrade file 118 can include a difference file that codes differences between the new file 112 and the original file 110 or, alternatively, can include any number and/or combination of components or modules of the new file 112. The host system 102 provides the upgrade information to the client devices 122 via transfer of the upgrade file 118 over the communication path 199.

In embodiments where the upgrade file 118 includes a difference file, components of the host system 102 including the processor 104 and the file differencing algorithm 114 process a comparison between the new file 112 and the corresponding original file 110, thereby calculating the differences between the new file 112 and the original file 110. The file differencing algorithm 114 generates the difference file during the comparison and writes information of the difference file to the upgrade file 118.

The upgrade file 118 is transferred or transmitted to the client devices 122 via the communication path 199. Prior to transfer, the upgrade file 118 may be compressed using any of a number of compression techniques known in the art, but is not so limited.

Components of the client devices 122 including the processor 124 and the upgrade client 126 receive the upgrade file 118 and control the upgrade of the original file on the client devices 122 using the upgrade file 118. The upgrade client 126 of the client device 122 includes at least one of a download sub-client ("SC") ("download SC"), an upgrade SC, and a self-upgrade SC (not shown), as described in the Related Applications, but is not so limited. The download SC functions to download or receive upgrade files 118 transferred from the host system 102. The upgrade SC uses information of the transferred files received from the host system 102 to perform upgrades to software of the client device 122. The self-upgrade SC functions to upgrade software of the upgrade client 126. The self-upgrade SC of an embodiment is stored in a different physical memory block or area than either of the download SC or the upgrade SC, but is not so limited. The software of the upgrade client 126 includes but is not limited to software of the download SC, the upgrade SC, and the self-upgrade SC.

In an embodiment, the upgrade client 126 processes information of the upgrade file 118 along with the hosted original file 110 to generate a copy of the new file in the client devices 122. This copy of the new file is subsequently used by the upgrade client 126 to upgrade the targeted original file hosted on the client devices 122. The upgrade client 126 of an embodiment uses numerous methods to update EBSCs depending on the file type to be updated and the resources allocated by the client device manufacturer to support these updates, as described in the Related Applications. Upon completion of this update process, the original file now stored on the client devices 122 is the same as the new file 112 received in the host system 102.

Those skilled in the relevant art will appreciate that those functions associated with the upgrade system 100 as well as the other functions and methods described herein with reference to the upgrade system 100 can be performed by components of the host system 102, components of the client devices 122, or distributed among any combination of components of the host system 102 and the client devices 122. Components of the host system 102 and client devices 122 can be implemented as ASICs, by DSP integrated circuits, and/or through conventional programmed logic arrays or circuit elements. The embodiments described herein can be implemented using any combination of hardware, firmware, and software running on one or more processors, where the software can be stored on any suitable computer-readable medium, such as microcode stored in a semiconductor chip, on a computer-readable disk, or downloaded from a server and stored locally at a client.

Figure 2:
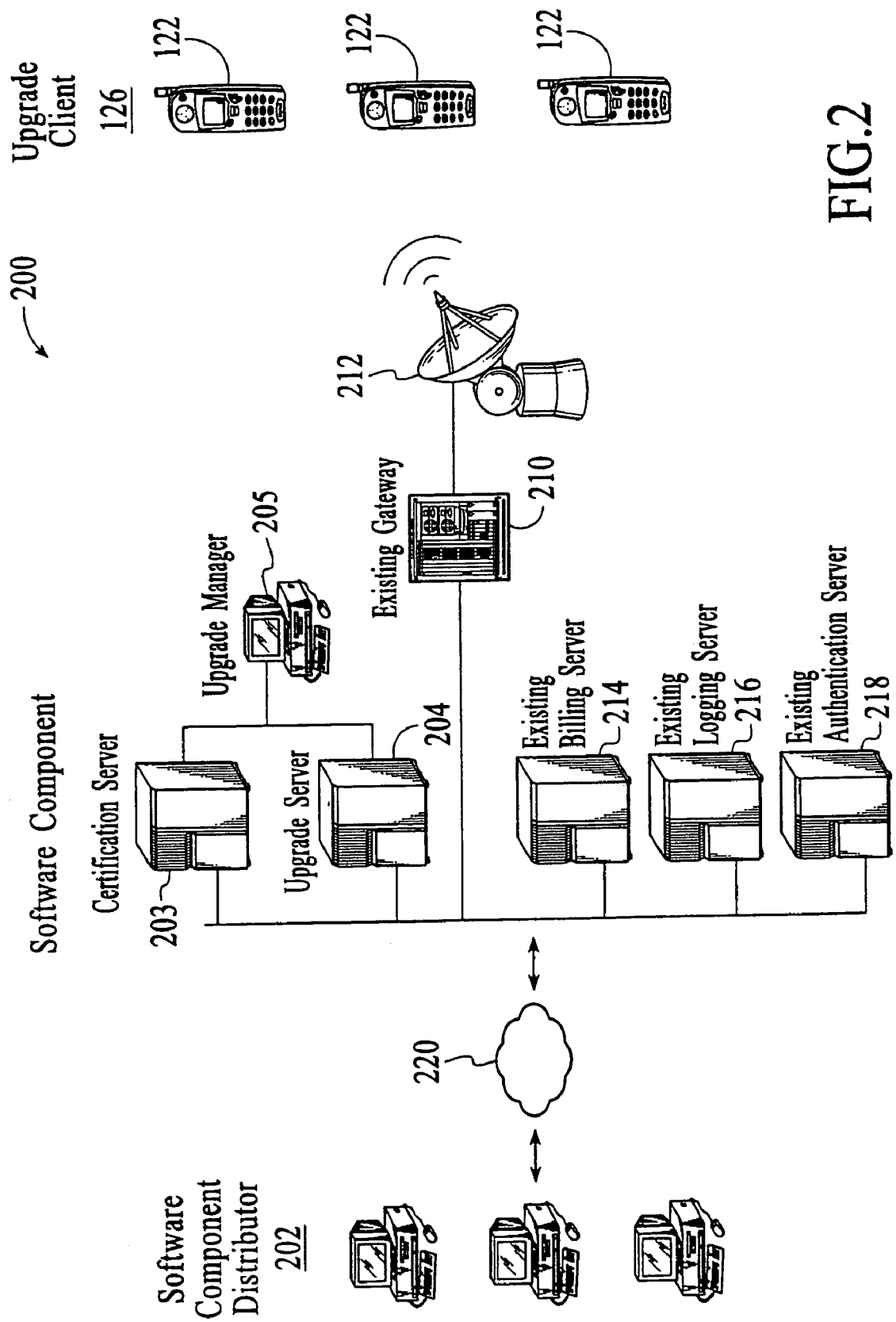
FIG. 2 is a block diagram of an example service provider infrastructure, under an embodiment.

FIG. 2 is a block diagram of an example service provider infrastructure 200 including components of the file upgrade system 100 of an embodiment. In this embodiment the service provider infrastructure is described in the context of a cellular telephone network or infrastructure, but alternative embodiments are not so limited. The service provider infrastructure 200 includes, but is not limited to, a Software Component Distributor ("SCD") 202, service provider upgrade components 203-205, and an upgrade client 126 hosted on the client devices 122. The service provider upgrade components 203-205 include an upgrade server 204 coupled among a software component certification server 203 and an upgrade manager 205.

With further reference to FIG. 1, the SCD 202 of an embodiment of the service provider infrastructure 200 includes components or functions of the host system 102. In alternative embodiments, the service provider upgrade components 203-205 host components or functions of the host system 102. In other alternative embodiments the components or functions of the host system 102 are distributed among components of the SCD 202 and the service provider upgrade components 203-205.

The service provider infrastructure 200 of an embodiment supports numerous types of software file or component upgrades on client devices 122 including mobile electronic devices, mobile communication devices, cellular telephones, personal digital assistants, computers, and other processor-based devices via the upgrade system components and various mechanisms of the service provider's wireless infrastructure. These systems function by receiving new and revised software from a software distributor, generating an upgrade file from the new software, and transferring the upgrade file to the client devices 122 via the service provider infrastructure. The upgrade client 126 of the client devices 122 uses the upgrade file to update the targeted software hosted on the client devices 122.

The SCD 202 of an embodiment provides a user interface by which software providers package and release new embedded device software components. Functions of the SCD 202 include registering device information and submitting device information to the software component certification server. Also, the SCD 202 receives new and original EBSCs, calculates or generates file differences using the new and original EBSCs, registers and packages embedded software, and submits embedded software packages to the software component certification server 203. The new or revised software, following release, is provided to the service provider upgrade components 203-205 via a wired, wireless, or hybrid wired/wireless network coupling or connection 220, but is not so limited.

The SCD 202 of an embodiment is hosted on processing systems of the client device manufacturers. In an alternative embodiment, the SCD 202 is hosted on processing systems of an application or system software provider. In another alternative embodiment, the SCD 202 is hosted on processing systems of the service carrier or provider, for example hosted on or distributed among the upgrade components 203-205.

The service provider upgrade components 203-205 are coupled among the software component distributor 202, the client devices 122, and the existing components of the service provider's infrastructure 210-218, including the existing gateway 210 and communication infrastructure 212, billing server 214, logging server 216, and authentication server 218.

The software component certification server 203 provides an interface to the manufacturers of client devices and, thus, receives new device information on embedded software packages from device manufacturers. The software component certification server 203 also repackages and distributes approved software packages to upgrade servers.

The upgrade manager 205, while functioning as an interface among the software component certification server 203 and the upgrade server 204, configures software and data packaging for optimal device management, schedules remote change notifications, and controls the update policy monitor system. Moreover, the upgrade manager 205 provides integration with the systems of the existing infrastructure.

The upgrade server 204 provides capabilities including authenticating, connecting, and communicating with mobile client devices 122 to perform embedded software component upgrades. Communication with client devices 122 can occur via couplings 212 with the client devices 122 that include wireless couplings, wired couplings, hybrid wired/wireless couplings, and other network coupling types, as appropriate to the corresponding service provider. In addition, the upgrade server 204 supports existing billing, data collection, and logging services of the service provider.

As an example of communications among the upgrade server 204 and client devices 122, when an upgrade file is available for transfer to a client device 122 from the upgrade server 204, the server 204 sends a user notification to notify the client device user that there are software components available for updating. The user notification can take the form of a text message via a Short Message Service ("SMS") push protocol, Hypertext Transfer Protocol ("HTTP"), or Wireless Application Protocol ("WAP"), but is not so limited. Upon receiving confirmation from the handset users, the upgrade server 304 uses the original handset data communication protocol to send the upgrade file to the requesting device.

In response to receipt of the confirmation from the device, the upgrade server 204 authenticates and authorizes the user and/or requesting device, and verifies prerequisite capabilities and limitations of the requesting device. Following authentication the upgrade server 204, as the manager of client device configuration data, identifies the current versions of embedded software components of the requesting device, identifies and transfers appropriate delta files to the requesting device, logs the status of the upgrade transaction, and reports the results to the upgrade manager 205. In addition, the upgrade server 204 activates/deactivates the software upgrade service over the air, and notifies remote users of software changes.

With reference to FIG. 1, the upgrade client 126 is embedded in the client devices 122, but is not so limited. The upgrade client 126 stores and maintains configuration data of the client devices 122, and provides for the maintenance and upgrading of embedded device software components. The upgrade client 126 supports a simple user interface and is incorporated into mobile device software. Upon execution, the upgrade client 126 automatically detects the remote change of any embedded software components, notifies users of an embedded software component upgrade, and upgrades a software component based on the carriers and/or users control, as appropriate for a particular service provider.

The upgrade system 100 and service provider infrastructure 200 of an embodiment support numerous types of software file or component update, including updates to executable files, byte stream files, and data files, but are not so limited. The executable files, or image files, include software files used in the client device to execute tasks, for example the operating system ("OS"), hardware device drivers, and K Virtual Machine ("KVM") files. The byte stream files include files used by other executable files, for example, icon files, logo files, and MP3 files. Data files include files containing personal use data, and handset reference data, for example the calibration configuration files, the Protocol Independent Multicast ("PIM") files, and system configuration files.

The upgrade client 126 of an embodiment uses numerous methods to upgrade EBSCs depending on the file type to be upgraded and the resources allocated by the client device manufacturer to support these upgrades, as described in the Related Applications. These upgrade methods of an embodiment include non-critical component updates, critical component updates, and update client component updates, where these categories are based on the functions provided by the software components targeted for update.

The software upgrading generally reduces the time required to rewrite the ROM of a host client device through the use of techniques that compare the new version of a program with the original version and isolate only the changes or differences in the machine code, as described above. The upgrade client of the client devices uses information of these differences, as received in the upgrade file, to upgrade the device ROM by rewriting only the differences, or the parts of the EBSCs or images that have changed, instead of rewriting the entire ROM.

In addition to the use of upgrade files that include difference files, additional reductions in the size of the upgrade file and the time required to upgrade client device programs can be achieved during file upgrading using DA and the DA Manager. The DA of an embodiment includes organizing code stored in a device ROM into groups of related EBSCs. Any references from one component to another component are identified and stored in the DA Manager along with the location or address of each component. The DA Manager is generated during the process of linking the EBSCs and is loaded along with the client device programs into the client device memory. The DA and DA Manager therefore allow the EBSCs of an image to be isolated and built independently.

The DA Manager manages component function calls, global variable references, and constant variable references so as to function as a centralized router or switchboard that knows the symbol location of each EBSC and links EBSCs as required during the execution of the client device programs. Any reference from one EBSC to another EBSC is routed via the DA Manager instead of directly between the EBSCs. If a component is modified during a file upgrade, and the upgrade results in a location change of the EBSC in ROM, this change is recorded by the DA Manager, thus maintaining the integrity of references or linkages to the EBSC present in the device programs.

The DA Manager described herein runs with an ARM processor core or processor hosting the Arm Developer Suite (ADS) Version 1.2 software package for example, but alternative embodiments can run on/with a variety of other processors. The DA and DA Manager of an embodiment are compatible with numerous embedded system platforms and not just the embedded systems described herein.

A number of terms are used in the description of the DA and DA Manager of an embodiment and, while a description of these terms is provided herein as an example, the embodiments are not limited to these descriptions. In describing the DA and DA Manager, an "image" is an executable file loaded onto a processor, and is alternatively referred to as a "binary image" or a "software image". A "section" is a block of software code or data of an image. A "region" is a contiguous sequence of one to three output sections (read only memory addresses ("RO"), read/write memory addresses ("RW"), and zero initialized memory addresses ("ZI") of an image); a region generally maps onto a physical memory device such as ROM, RAM, and/or peripheral. A "load view" is the address of sections and regions of an image that has been loaded into memory but has not yet started execution. An "execute view" is the address of sections and regions of an image that has been loaded into memory and is being executed. "Scatter loading" includes assigning the address and grouping of code and data sections individually rather than using single large blocks. "RO-CODE" refers to read-only code addresses. "RO-DATA" refers to read-only data addresses. "RW-DATA" refers to read/write data addresses. "ZI-DATA" refers to zero initialized read/write memory used to hold variables that do not have an initial value. "Symdef file" is a symbol definition file that includes global symbols and the associated finial run time addresses.

The DA of an embodiment operates to break function call dependencies by inserting a common component at a fixed location in a DA Manager of the binary image so that when function call destination addresses change due to code changes, the calling function continues to call the common component of the DA Manager, and the DA Manager directs the call to the appropriate component in the image. The information of the common components of the DA Manager are therefore changed in accordance with any function call destination address changes to direct function calls to the common components to the new destination addresses.

Figure 3:
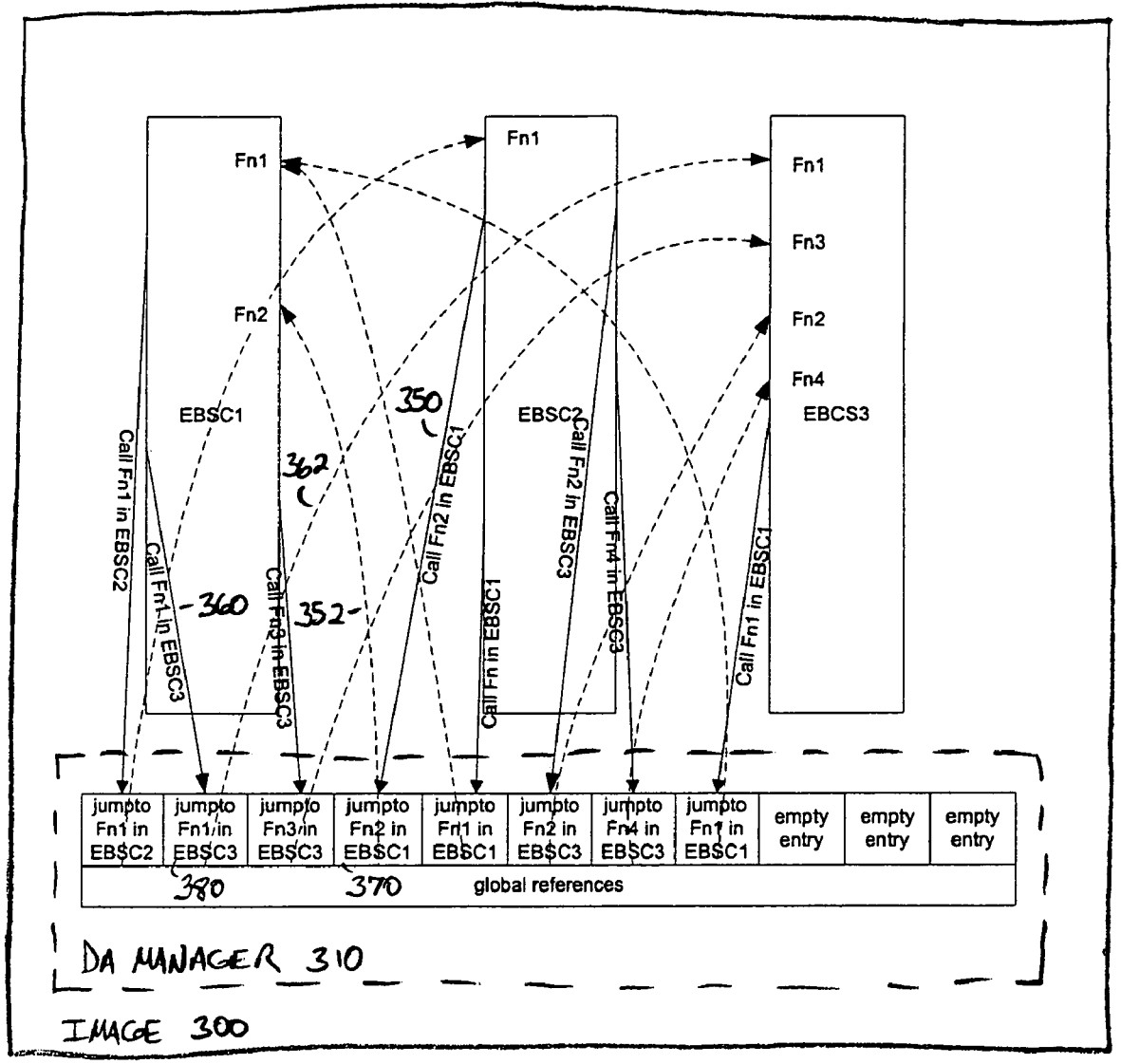
FIG. 3 is a block diagram of DA showing interactions between the DA Manager and the software components of an image, under an embodiment.

As one example of the component-based memory management provided herein, FIG. 3 is a block diagram of DA showing interactions between the DA Manager 310 and the EBSCs EBSC1/EBSC2/EBSC3 of an image 300, under an embodiment. As described above, the images of an embodiment include software components (EBSCs) and at least one DA Manager. An image includes linked components, where components like the EBSC include independently-built images with functions that are specially grouped together by design. As an image is divided into different components, there will be function calls, global variable references, and constant variable references from one component to other components, as described below.

The DA of an embodiment identifies the function calls and global references among the components of an image and decouples the dependency between individual components so that when software upgrades or changes are made to an image, only the DA Manager and those components that have been modified are upgraded. The DA Manager subsequently controls or manages the inter-component activities during execution of the image by managing and redirecting the function calls and global references.

As one operational example of the DA Manager, with reference to FIG. 3, a call 350 in EBSC2 directing operation to function 2 of EBSC1 calls a component 370 of the DA Manager 310. The called component 370 of the DA Manager 310 in turn directs operation 352 to function 2 of EBSC1. As another operational example of the DA Manager, a call 360 in EBSC1 directing operation to function 1 of EBSC3 calls a component 380 of the DA Manager 310. The called component 380 of the DA Manager 310 in turn directs operation 362 to function 1 of EBSC3.

Continuing with the example, when a software upgrade of the client device necessitates changes to EBSC1 of the image 300 that results in a location change of the EBSC1 in memory, for example, the upgrade results only in upgrades to EBSC1 and upgrades to the components 370 of the DA Manager 310 having links associated with EBSC1. Consequently, because the DA Manager 310 serves to maintain the integrity of references or linkages among the EBSCs of the image 300, the DA Manager 310 alleviates any requirement to upgrade or rewrite all EBSCs of the image 300 because of an upgrade to a particular EBSC like EBSC1.

In managing the links among the EBSCs of the image 300, the DA Manager of an embodiment uses a number of techniques to manage different types of global references. In particular, the DA Manager manages global references including function calls and global variables, but is not so limited.

The function calls of a component are generally in the format of relative offset jump/branch instructions or absolute address jump/branch instructions with the destination offset/address located in one or more other components of the image. The binary codes are located at the RO-CODE/text sections that include the read only code addresses. Based on the execution view addresses and component boundary, function calls are classified and handled as either inter-component function calls or intra-component function calls, as described below.

Regarding inter-component function calls, and as a result of the nature of jump/branch instructions, the DA Manager of an embodiment includes a centralized jump table referred to herein as a Vector Table (VT) to manage the inter-component function calls and handle the associated redirecting. During execution, a function call from a component made to a function located in another component results in calling of an entry in the VT, as described below. The VT then redirects the call to the appropriate location in device memory corresponding to the called component/function. Sample ARM mode code of a VT entry follows for an inter-component function call, as an example, but the embodiment is not limited to this sample code:

```
import EBSC2_Fn1
    ldr    pc,addr_EBSC2_Fn1
    addr_EBSC2_Fn1    dcd    EBSC2_Fn1
import EBSC3_Fn2
    ldr    pc,addr_EBSC3_Fn2
    addr_EBSC3_Fn2    dcd    EBSC3_Fn2
```

In contrast to the inter-component function calls, the intra-component function calls (function calls to local functions within a component) are not affected by upgrades to a component. The intra-component function calls are not affected because, as the upgrade results in upgrading of the complete component, the component upgrade includes the appropriate upgrades to the intra-component function calls. Therefore, the intra-component function calls do not go through the VT. Furthermore, the call sequence of the intra-component function calls is not effected using the VT, but the embodiment is not so limited.

Turning to global variables and the associated references using the DA and DA Manager of an embodiment, there are three subtypes of global variables, including global constant variables, global RW variables, and global ZI variables. The global constant variables are in the RO-DATA/.const sections of the image code and, although they are referred to as "variables", they can be referenced from device ROM and are not capable of modification at run time. The global RW variables are RAM variables that may be modified at run time and are set to their initial values during system initialization. The global ZI variables are also RAM variables that may be modified at run time and, in contrast to the RW variables, are cleared to a value of zero (0) during system initialization.

The DA and DA Manager of an embodiment manage references to global variables of a component using one or a combination of inter-component and intra-component global references, also referred to herein as "global references". Regarding inter-component global variable references, a global variable reference is different from the function call described above because it directly loads the content of an address instead of a jump/branch instruction.

The DA of an embodiment manages inter-component global references using centralized locations of the DA Manager. Using the centralized DA Manager locations, every inter-component global constant variable, global RW variable, and global ZI variable can be assigned to new types of sections. As an example, the global constant variable may be assigned to a new section referred to as the "globalConst" section, the global RW variable may be assigned to a new section referred to as the "globalRW" section, and the global ZI variable may be assigned to a new section referred to as the "globalZI" section. These new sections/variables are then scatter loaded into a centralized section at link time, for both load view and execution view. Since it is useful to maintain the addresses for variables of unchanged components during an upgrade, centralized locations make it easier to manage and verify the location of the variables thereby simplifying the DA Manager building process.

The DA and DA Manager of an alternative embodiment manage inter-component global references using access functions. An access function, which is a wrap function generated at the source code level, converts references of global variables to function calls so the VT can be employed to handle these references. Situations that are suitable for using access functions include those when source code is not available, when a change of source code is highly undesirable, and when the number of inter-component variable references is very limited so no separate section is needed.

An example of an access function in file foo.c is
    int interCompGlobalVarA;

and an example of an access function in file foo.c or other files is
    interCompGlobalVarA= . . . .

Sample ARM mode code of a VT entry follows for an access function, as an example, but the embodiment is not limited to this sample code:

```
void setInterCompGlobalVarA(int value)
{
    interCompGlobalVarA = value;
}
void readInterCompGlobalVarA(int*value)
{
    *value = interCompGlobalVarA;
}
```

When using access functions, the references to "interCompGlobalVarA" are changed to use one of the access functions above.

In contrast to the inter-component variables, intra-component variables, or local variables within a component, are not affected by upgrades to a component because the component upgrade includes the appropriate upgrades to the intra-component variables. Therefore, the intra-component variables do not go through the globalConst variable/section, the globalRW variable/section, and the globalZI variable/section. Furthermore, the reference sequence of the intra-component function calls is not effected using the globalConst variable/section, the globalRW variable/section, and the globalZI variable/section, but the embodiment is not so limited.

Figure 4A:
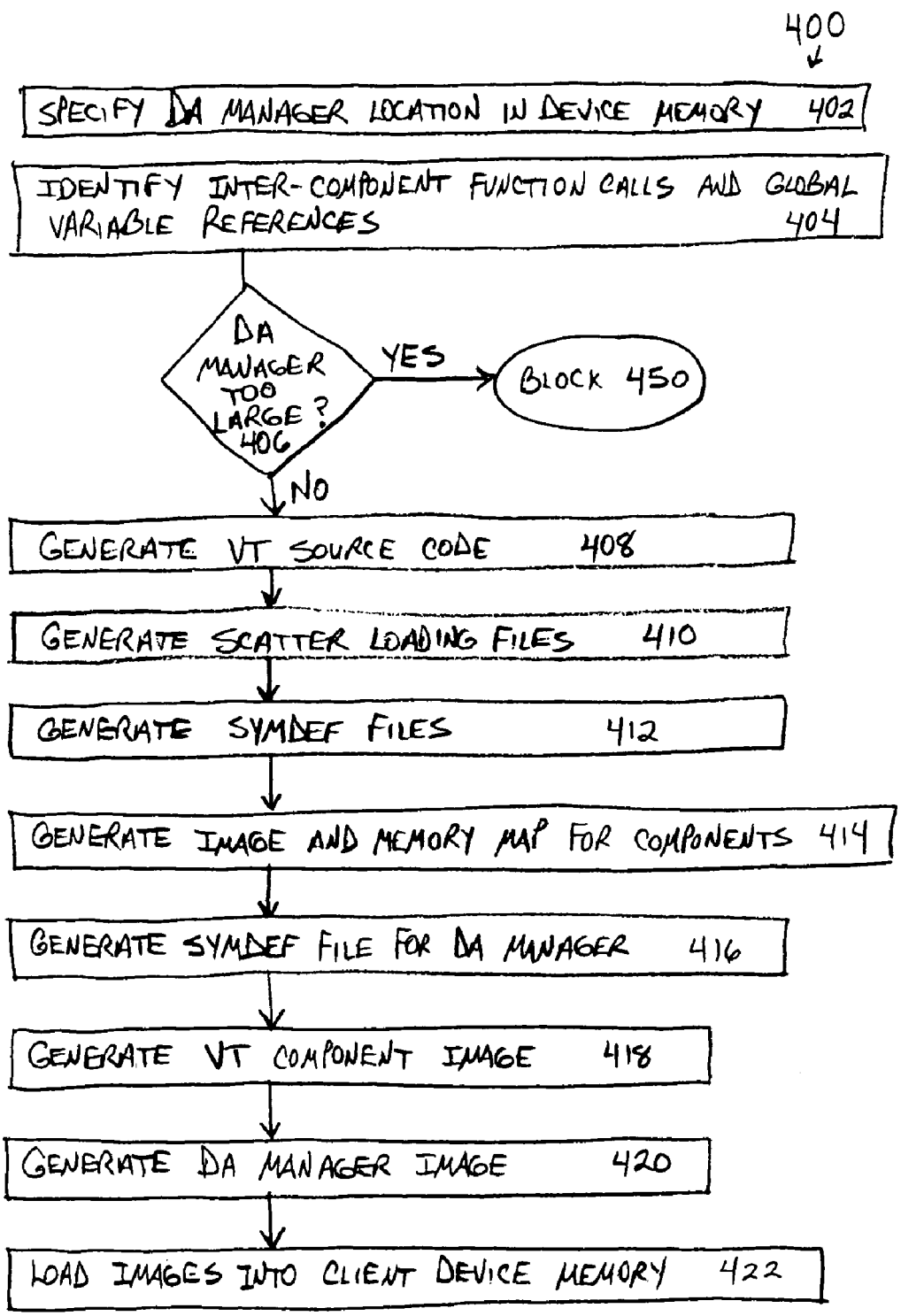
FIGS. 4A and 4B show a flow diagram for building an image that includes a DA Manager, under an embodiment.
Figure 4B:
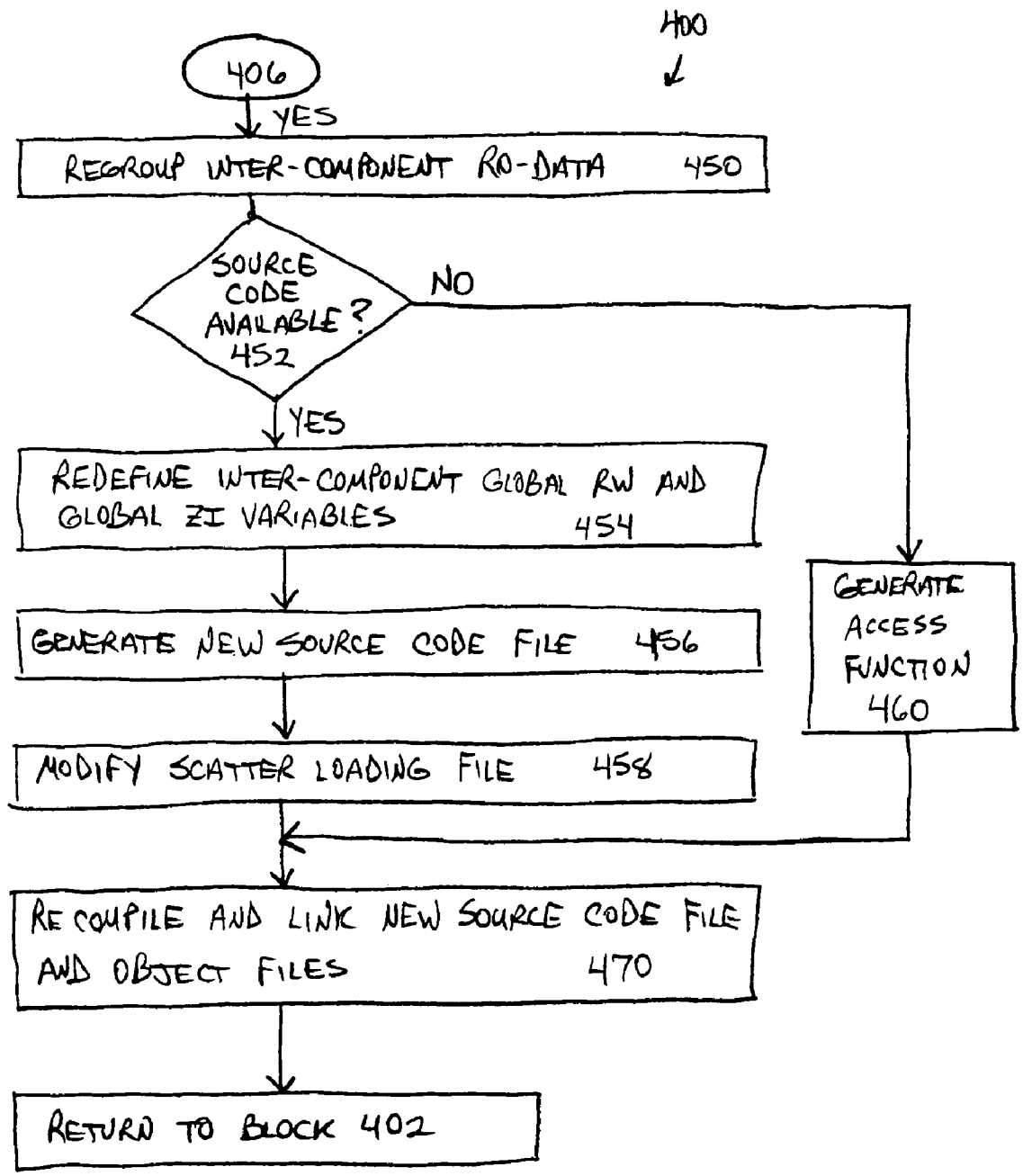

The DA Manager of an embodiment includes an image building process for use in generating an image that includes a DA Manager. As an example, FIGS. 4A and 4B show a flow diagram 400 for building an image that includes a DA Manager, under an embodiment. The DA image building procedure generates a highly reliable, error free binary image, and the procedure can generally be divided into a pre-compilation stage, a post-linker stage, and a code generating stage, but is not so limited. The pre-compilation stage of the image construction prepares the original building environment for the DA process. The post-linker stage may be run multiple times until an image that includes a DA Manager can be reliably generated. The code generating stage generates the assembly code for the DA Manager component of the image.

The building process of an embodiment uses resources including an Image Memory Map file with Cross Section References information, an original component aware scatter loading file, an Original Call Graph file, and manufacturer object files with third party library object files. Alternative embodiments can use additional resources and/or other types/combinations of resources. Source code files are not required to be available in order to build an image that includes a DA Manager, but source code files can help the binary image performance and run time resource requirement.

With reference to the flow diagram 400 for building an image that includes a DA Manager, components of the client device initiate the building process by specifying a location in device memory to host the DA Manager, including the load view and execution view of the VT, and the global references, at block 402. Components of the client device identify inter-component function calls and inter-component global variable references using information of at least one of the original image map file, the original component-aware scatter loading file, the call graph file, and the original source code file (optional), at block 404. A determination is made whether entries of the DA Manager are too large to fit in the specified location in device memory using information of the identified inter-component function calls and inter-component global variable references, at block 406. The DA Manager is an independent component or EBSC that generally occupies one block of memory in the client device memory, but is not so limited.

If entries of the DA Manager are too large to fit in the specified location in device memory, at block 406, rearrangement of components is performed to reduce inter-component references. The rearrangement of components includes regrouping or re-assigning all inter-component global constant variables (RO_DATA) to a new globalConst section, at block 450, but is not so limited. A determination is made whether the original source code file is available, at block 452. If the original source code file is available, all inter-component global RW variables (RW-DATA) and global ZI variables (ZI-DATA) are changed or redefined in the original source code as external references "extern", at block 454. A new source code file (globalInter.c) is generated having a centralized declaration of the inter-component global RW variables (RW-DATA) and global ZI variables (ZI-DATA), at block 456. The centralized declaration includes assigning the global RW variables to a new globalRW section and assigning the global ZI variables to a new globalZI section, but is not so limited. The scatter loading file is also modified to include the regrouped inter-component global constant variables (globalConst) along with the globalRW and globalZI sections, and the Make file is modified, at block 458. Following generation of the new source code file (globalInter.c) the new source code file is re-compiled, and the object file is re-linked, at block 470. Operation then returns to specify a location in device memory to host the DA Manager, including the load view and execution view of the VT, and the global references, at block 402.

If the original source code file is not available for the operations of blocks 454, 456, and 458, as determined at block 452, then an access function is generated following rearrangement of components to reduce inter-component references (block 450), at block 460. The access function converts references of the global variables to function calls as described above. Following generation of the access function the source code file is re-compiled, and the object file is re-linked, at block 470. Operation then returns to specify a location in device memory to host the DA Manager, including the load view and execution view of the VT, and the global references, at block 402. The operations of blocks 450-470 are repeated by components of the client device until the size of the DA Manager entries fit in the specified location in device memory (block 406).

At such time as entries of the DA Manager fit in the specified location in device memory, as determined at block 406, operation continues to generate VT source code for the inter-component function calls of each component, at block 408. The client device also generates new or modified scatter loading files for each component, at block 410. Further, the client device also generates symbol definition files symdef for each component, at block 412, where each symdef file defines the external references for the corresponding component using VT table entry addresses. A symdef file is not needed for components not used in the VT. The operations of blocks 408, 410, and 412 use information of at least one of the original image map file and the modified scatter loading file, but are not so limited.

Operations of the client device continue by compiling/assembling and re-linking the components of the image and generating an image and a memory map for each component, at block 414. The re-linking operations of an embodiment do not include links to the DA Manager component, but are not so limited. The client device also generates a symdef file for the DA Manager component that includes the finial symbol locations, at block 416. The client device then compiles and re-links the VT object file with local symbols of each component to generate the VT component image, at block 418. The client device also compiles and links the DA Manager component to generate the DA Manager image, at block 420. The images including the DA Manager image are loaded into client device memory, at block 422.

The client device of an embodiment uses the DA described above when a software upgrade is performed that includes upgrades to particular or pre-specified components of the client device, after the client device has been manufactured. The DA Manager is changed or upgraded during the software upgrade using the building processes described above when one or more of the upgraded components include inter-component references.

During software upgrades of the client device in which a new version of an image is generated, the building processes described above generate the images of the upgraded components. Those components that are not modified should be identical to their earlier version, but the DA Manager entries corresponding to the inter-component function calls should be verified. New inter-component function calls and global variables that do not fit into a corresponding original component due to code changes will be added to the end of occupied lots of the last version of the image, but are not so limited. Further, all existing symbols of the DA Manager keep their original addresses unless otherwise specified.

Following building of the DA Manager, the DA Manager functions as a centralized router or switchboard that knows the symbol location of each EBSC and links EBSCs as required during the execution of the client device programs. Any reference from one EBSC to another EBSC is routed via the DA Manager instead of directly between the EBSCs. If a component is modified during a file upgrade, and the upgrade results in a location change of the EBSC in ROM, this change is recorded by the DA Manager, thus maintaining the integrity of references or linkages to the EBSC present in the device programs.

As described above, revision of files involves the writing of new and updated EBSCs to memory locations of the host device. Often, the new EBSC will not be exactly the same size or have exactly the same start address as the original EBSC it replaces. The upgrade client of an embodiment provides device memory management options including DA of upgradeable EBSCs to accommodate writing of the new EBSC regardless of the EBSC size or start address.

Figure 5:
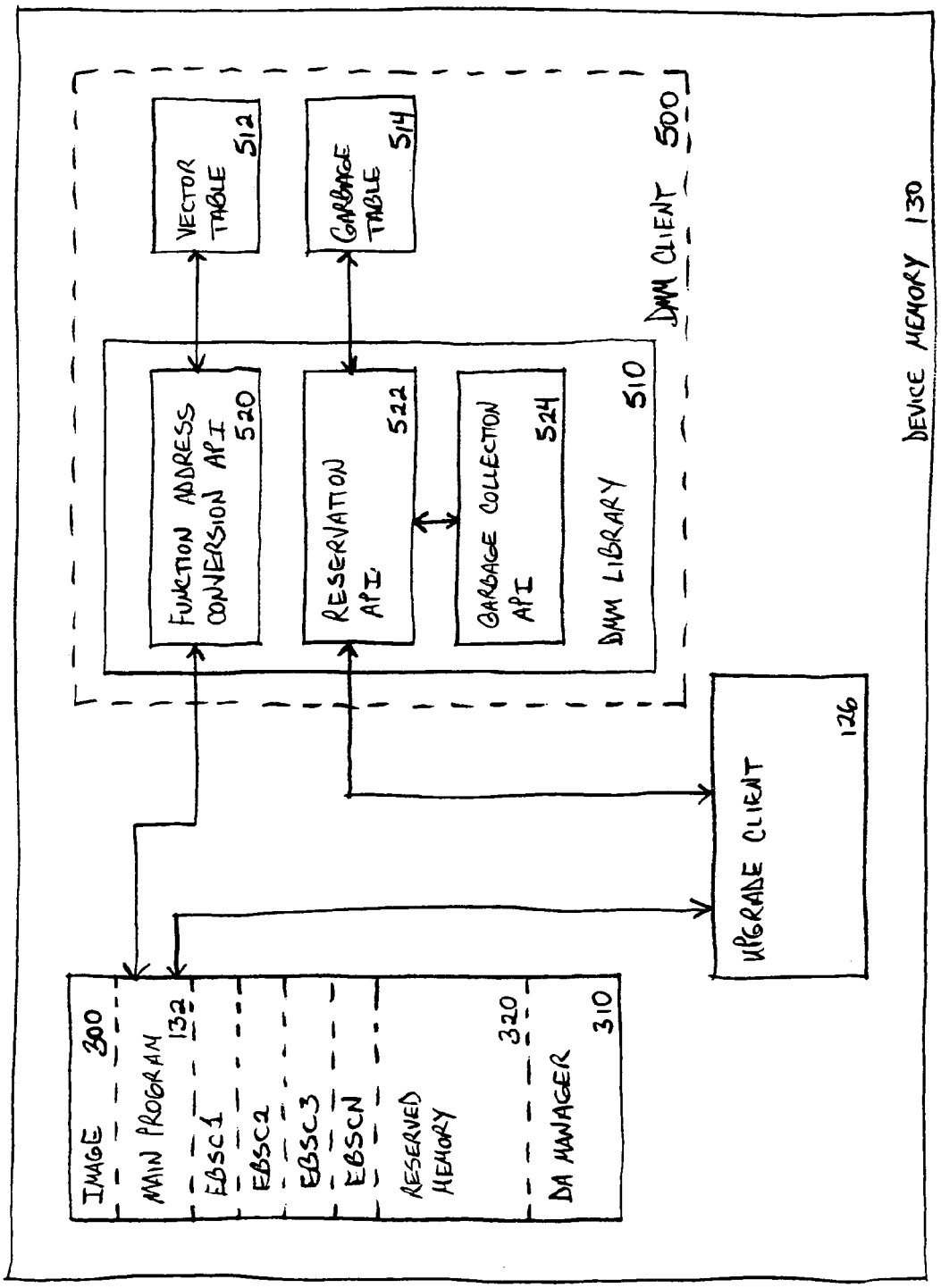
FIG. 5 is a block diagram of the device memory showing an example of interaction among components of the memory including components of the software image, the upgrade client, and the DMM Client, under the embodiments of FIGS. 1 and 3.

As an example of a device memory that uses DA during upgrading of components of the device memory, FIG. 5 is a block diagram of the device memory 130 showing an example of interaction among components of the memory 130 including components of the software image 300 (in an embedded software area), the upgrade client 126, and the DMM Client 500, under the embodiments of FIGS. 1 and 3. The device memory 130 of an embodiment is flash ROM, but many types of memory and/or combination of memory types may be used in this embodiment or in alternative embodiments of the device memory 130.

The DMM Client 500 of an embodiment includes a DMM library 510, a VT 512, and a garbage table 514, but is not so limited. While the VT 512 is shown as being a component of the DMM Client 500, the VT 512 may be collocated with the DA Manager 310 or in another section of the image 300 or the DMM client 500. The DMM library 510 includes one or more of a function address conversion application programmer interface ("API") 520, a reservation API 522, and a collection API 524. The DMM library 510 may include one or more additional APIs in some combination with one or more of the function address conversion API 520, the reservation API 522, and the garbage collection API 524.

The DA during software upgrades, while allowing for more advanced memory management, generally supports modification of both the start addresses and sizes of EBSCs and EBSC groups during each update. The upgrade client of an embodiment supports dynamic addressing using interactions among the APIs of the DMM Client 500 and at least one data table. As such, DA increases the efficiency of ROM utilization and device memory map design while supporting faster update processing with a lower probability of update failures.

In performing memory management using DA, the upgrade client identifies and reserves memory blocks large enough to accommodate new software components by performing sequential searches of host device memory areas including at least one first and second memory area. When the new component size exceeds that of available blocks of the searched memory areas, the upgrade client rewrites a first memory area to eliminate unused memory blocks, reapportions the first and second memory areas, writes the new component to the second memory area, and updates a vector table, as described below.

Figure 6:
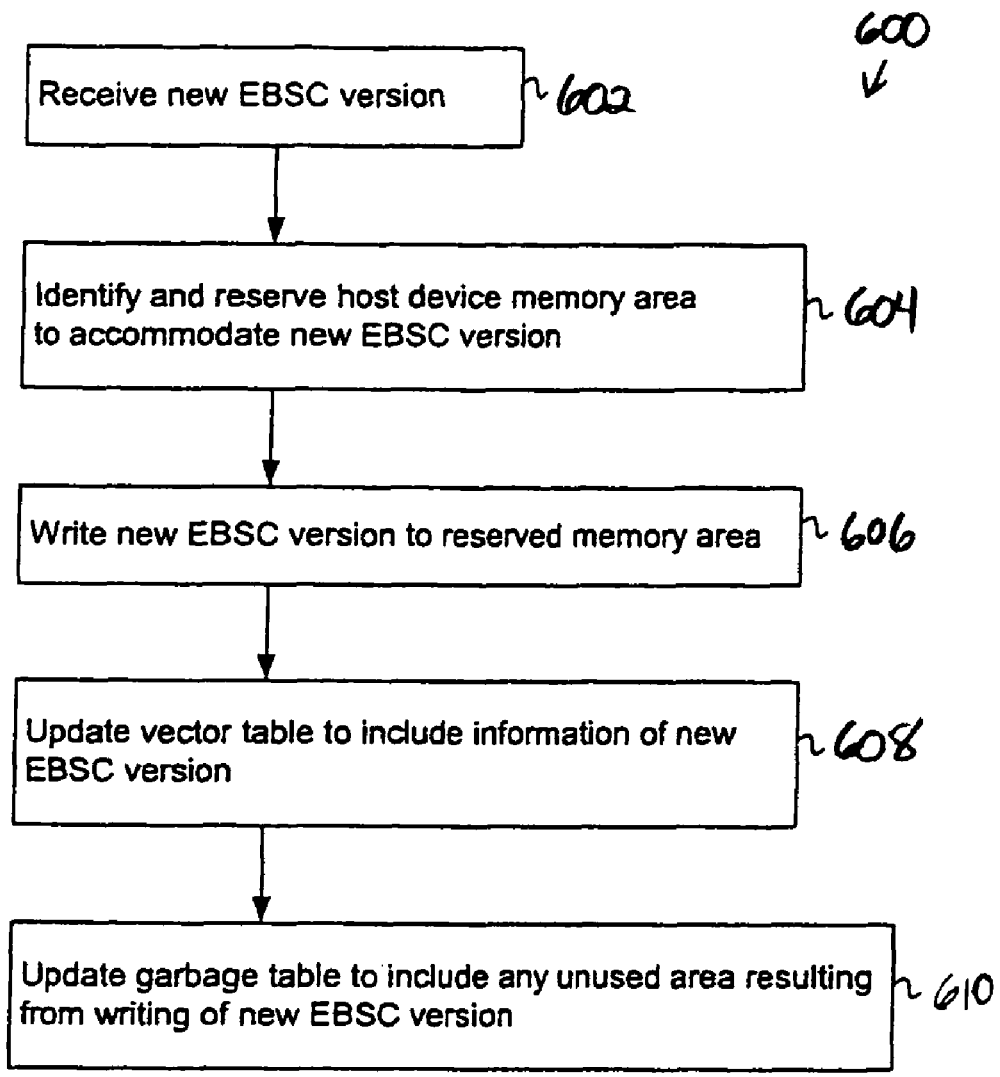
FIG. 6 is a flow diagram for upgrading an EBSC or EBSC group using DA, under an embodiment.

FIG. 6 is a flow diagram 600 for upgrading an EBSC or EBSC group using dynamic addressing, under an embodiment. The upgrade client receives the new EBSC version, at block 602. The new EBSC version is generated from the original EBSC version and the corresponding upgrade file or, alternatively, is received from the software component distributor. A memory area is identified and reserved in the client device to accommodate storage of the new EBSC version, at block 604. At block 606, components of the upgrade client write the new EBSC version to the reserved memory area. Updates are made to the VT, at block 608, in order to make any necessary changes to the information of the VT resulting from the new EBSC version. Also, at block 610, updates are made to the garbage table to reflect any changes in the unused memory area resulting from writing of the new EBSC version.

To access software components in a client device using DA, the upgrade client receives a function call from the main program of the client device including identification information of corresponding software components, reads a start address of the corresponding software components from the VT, and generates a call for the corresponding software components. As such, when a first EBSC calls a second EBSC, the upgrade client changes the function calling sequence so that, instead of calling the second EBSC directly using a static address, the first EBSC calls an API of the upgrade client using a static address. The called API converts the received call to a call to the second EBSC using the corresponding static address and arguments of the runtime VT.

Figure 7:
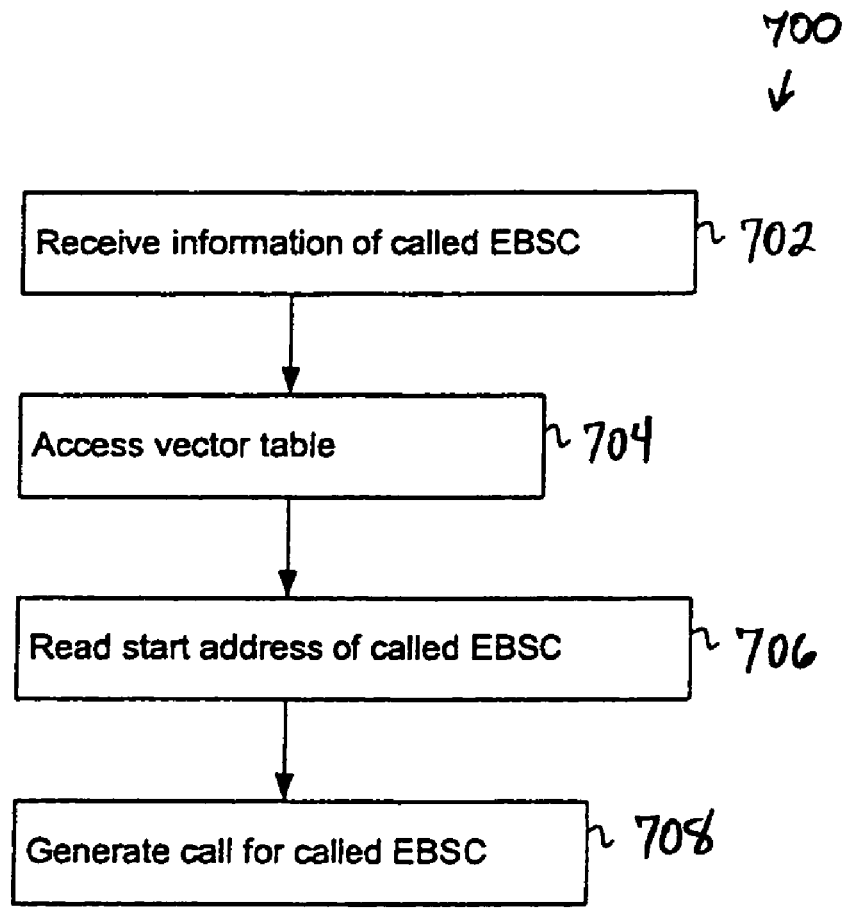
FIG. 7 is a flow diagram of a function call using DA, under an embodiment.

FIG. 7 is a flow diagram 700 of a function call using DA, under an embodiment. The main program of the host device supports user-requested functions using EBSCs stored in the device memory. When a function is requested by a user, an EBSC of the main program of the client device calls the EBSCs associated with the particular function by directly calling components of the upgrade client using a static address. In response to the call, the upgrade client receives information from the main program that includes a function or EBSC identification and the arguments to the function, at block 702. The upgrade client accesses the VT, at block 704, which includes entries for each EBSC available to the main program along with corresponding start addresses of the EBSC. The upgrade client reads the start address and associated arguments from the VT, at block 706. Using the start address information along with the information of the called EBSC received from the main program, the upgrade client generates a call for the actual function, and the corresponding EBSC, along with all the received arguments, at block 708.

Returning to FIG. 5 and the interactions among components of the memory 130, the function address conversion API 520 generates calls from the client device main program 132 for EBSCs associated with particular host device functions, as described above with reference to FIG. 7. The main program 132 of the client device calls an EBSC associated with a particular function by directly calling the function address conversion API 520. The direct call of the API 520 is made instead of a direct call of the EBSC. At the time of the call, the function address conversion API 520 receives information from the main program 132 that includes function identification information and the arguments to the function.

In response to the call, the function address conversion API 520 accesses the VT 312. The VT 512 includes an entry for each function available to the main program 132 along with the corresponding start address of the function in the device memory 130. The function address conversion API 520 reads the start address of the function requested by the main program 132 from the VT 512 and, using the start address information along with the information of the called EBSC received from the main program 132, generates a call for the actual function along with all the received arguments.

Figure 8:
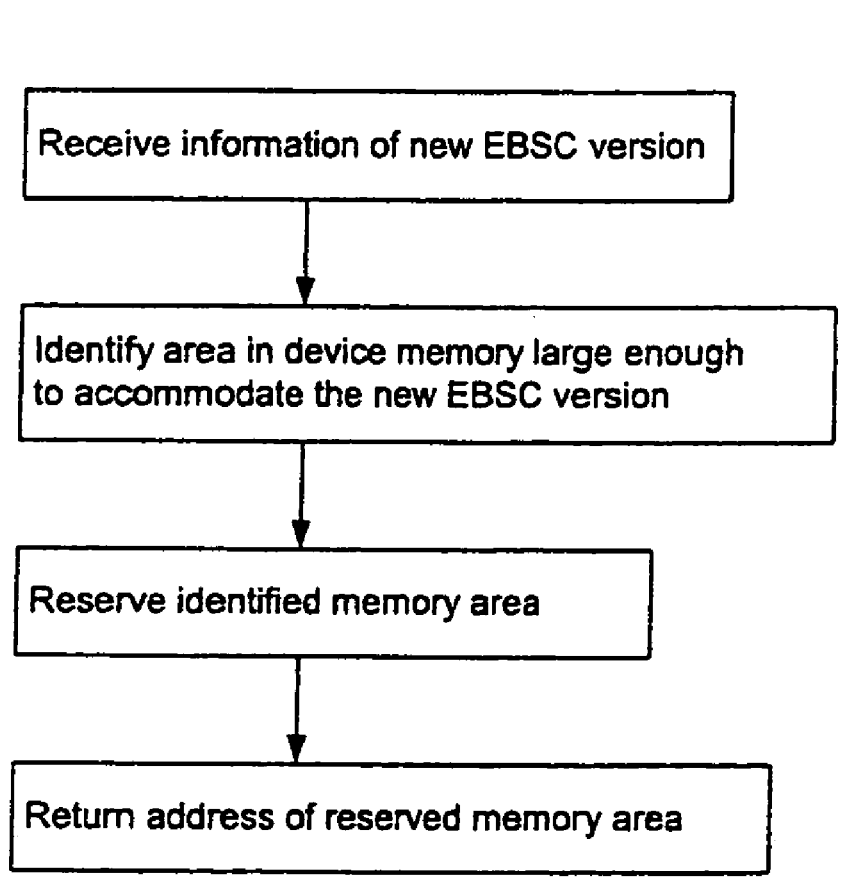
FIG. 8 is a flow diagram for reserving memory areas to accommodate new versions of an EBSC, under an embodiment.

The upgrade client 126 of an embodiment uses the API for reservation of a new version of an EBSC 522, referred to herein as the reservation API 522, to locate and reserve areas in memory to accommodate new versions of EBSCs or EBSC groups. With reference to FIG. 5, the reservation API 522, when called by the upgrade client 126, receives identification information for the new EBSC version, information that includes the file size of this new version. The file size of the new EBSC version is the size of the area that is to be reserved in the device memory 130 to store the new EBSC version. The reservation API 522 locates an appropriate area in memory 130 and returns the start address of the requested reservation area upon successfully reserving the memory area. FIG. 8 is a flow diagram 800 for reserving memory areas to accommodate new versions of an EBSC using the reservation API 522, under an embodiment.

Figure 9:
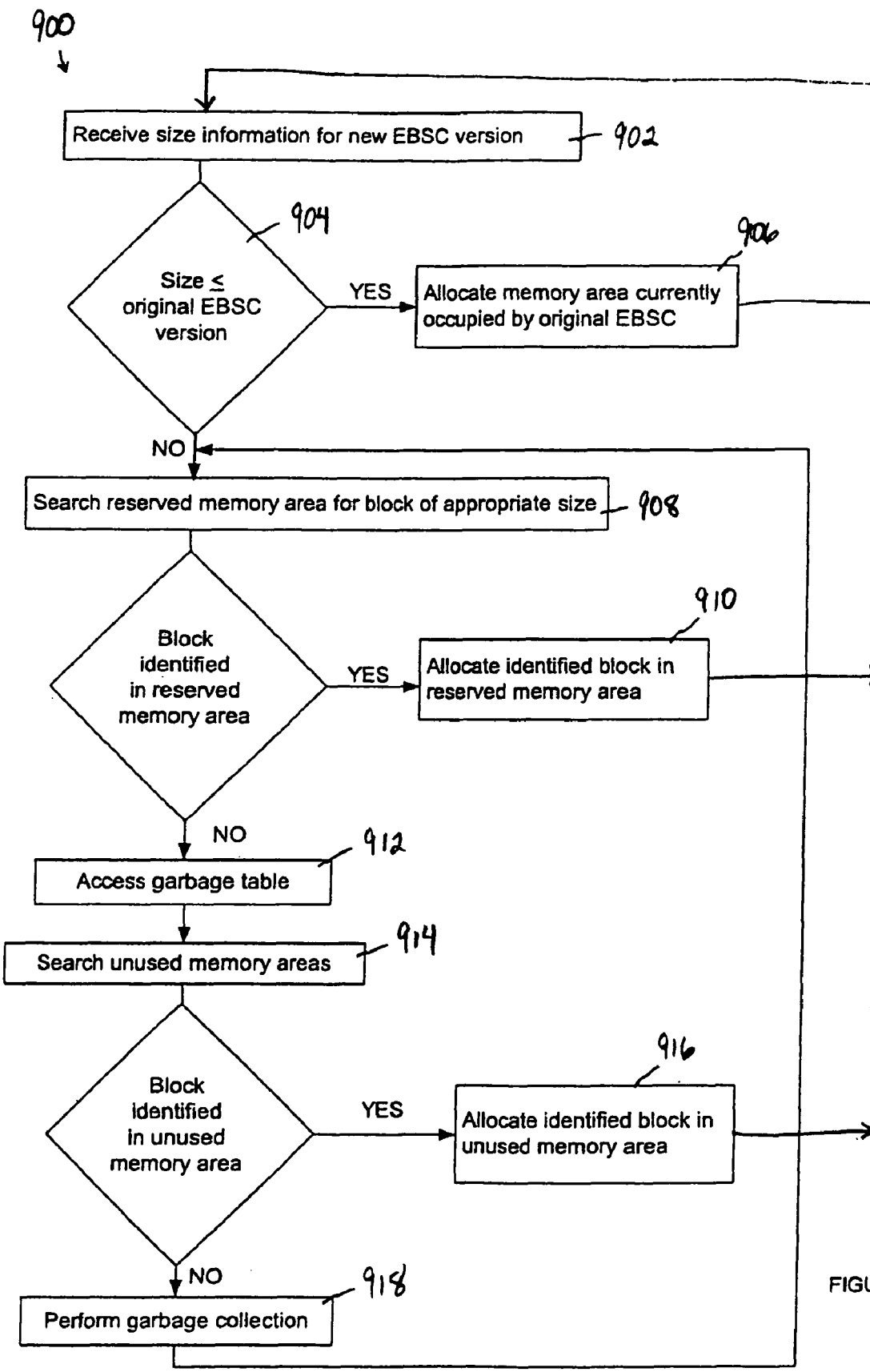
FIG. 9 is a flow diagram for locating memory blocks to accommodate new versions of an EBSC, under an embodiment.

In allocating a memory block of the requested size, the reservation API 522 applies a set of rules as follows, but alternative embodiments may apply different rules to effect equivalent results. FIG. 9 is a flow diagram 900 for locating memory blocks to accommodate new versions of an EBSC using the rules of the reservation API, under an embodiment. Upon receiving information as to the size of the new EBSC, at block 902, the reservation API determines whether the size of the new EBSC exceeds the size of the original EBSC, at block 904. When the size of the new EBSC is equal to or less than the size of the corresponding original EBSC, the reservation API allocates the memory block currently occupied by the corresponding original EBSC to receive the new EBSC, at block 906. Otherwise, the reservation API tries to locate a memory block having the requested size from the available memory in the reserved memory area.

In continuing the search, the reservation API searches the reserved memory area of the client device for a memory block having the requested size, at block 908. If an appropriately sized block is found in the reserved memory area, the reservation API allocates the memory block to receive the new EBSC, at block 910. If an appropriately sized memory block is not available in the reserved memory area, the reservation API accesses the garbage table, at block 912. The reservation API uses information of the garbage table to search the unused memory areas of the main program, at block 914, in an attempt to locate a memory block of the requested size among the unused areas corresponding to the entries in the garbage table. The unused areas of an embodiment, referred to herein as garbage areas, include unused areas of the main program, but the embodiment is not so limited. If an appropriately sized memory block is found in the unused memory areas, the reservation API allocates the block to receive the new EBSC, at block 916.

The reservation API of an embodiment initiates a process referred to herein as garbage collection, at block 918, if it cannot locate an appropriately sized memory block. Also, the reservation API initiates garbage collection when all entries of the garbage table are occupied. With reference to FIG. 5, the API for garbage collection 524, referred to herein as the garbage collection API 524, is called by the reservation API 522, but is not so limited. The API for garbage collection 524 generally receives no argument and cleans up all garbage in the reserved areas for EBSCs and for EBSC update, but is not so limited.

Figure 10:
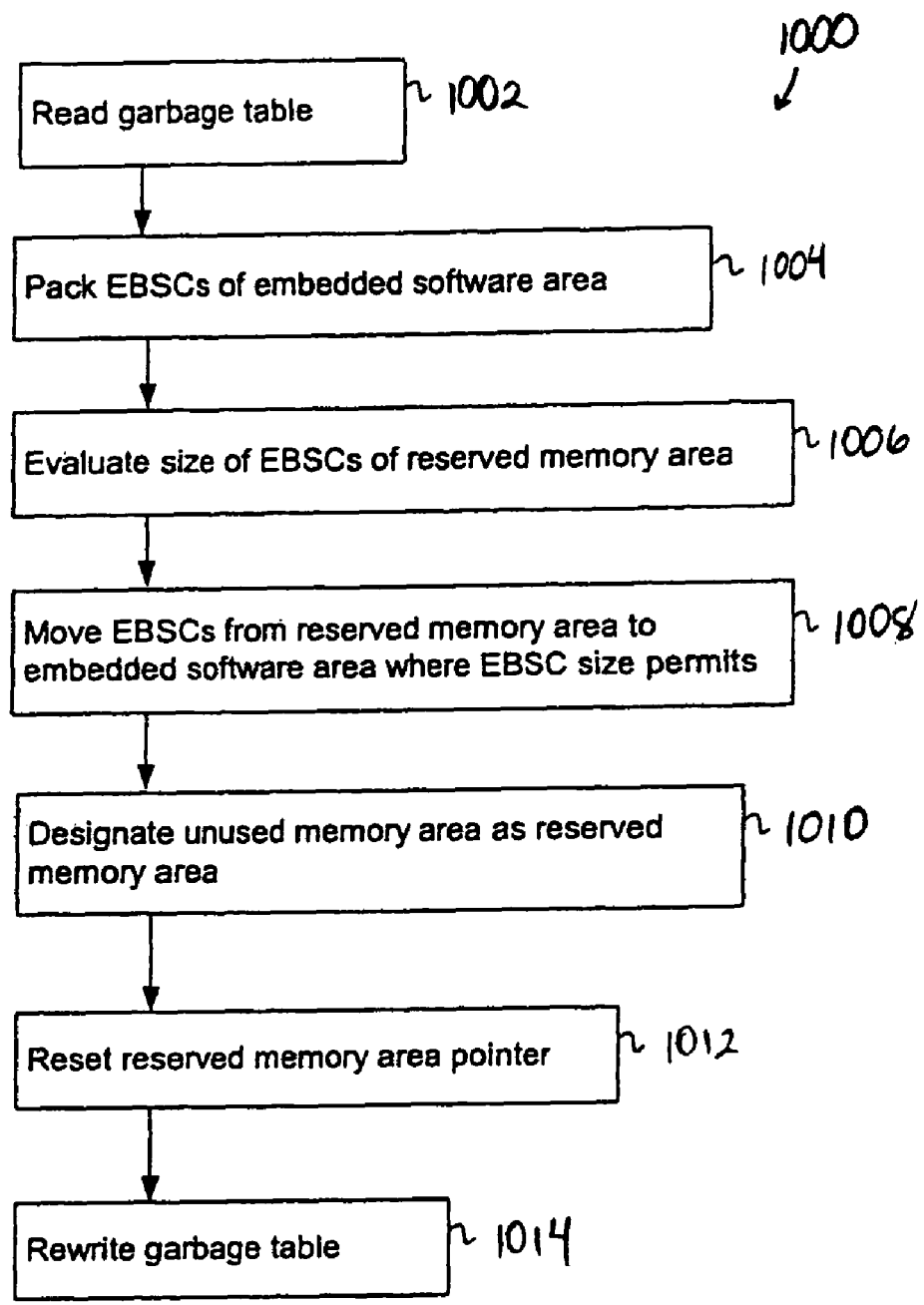
FIG. 10 is a flow diagram of garbage collection, under an embodiment.

As described above, the reservation API 522 initiates garbage collection if it cannot find enough memory for the requested reservation size or if the garbage entry table becomes full. FIG. 10 is a flow diagram 1000 of garbage collection, under an embodiment. In initiating garbage collection, the reservation API calls the garbage collection API. When called, the garbage collection API reads the garbage table entries, at block 1002, and causes the embedded software area of the device memory to be rewritten so as to sequentially pack the EBSCs of the memory up in memory, at block 1004. Alternative embodiments may pack the EBSCs down in the main memory, but the embodiment is not so limited. This packing operation removes the unused areas in the embedded software area.

Following this packing operation, the garbage collection API evaluates the size of each EBSC stored in the reserved memory area, at block 1006, and compares the size against any unused memory blocks remaining in the main program of the embedded software area following its rewriting. This evaluation determines if the amount of unused memory remaining following the rewriting of the embedded software area can accommodate any EBSCs of the reserved memory area so that, where possible, EBSCs can be moved out of the reserved memory area and into the embedded software area of the device memory. The EBSCs of the reserved memory area are evaluated sequentially, but the embodiment is not so limited. The EBSCs are rewritten from the reserved memory area to the embedded software area where EBSC size permits, at block 1008. As the EBSCs are rewritten in one embodiment, they are stored sequentially in the embedded software area following the packed EBSCs.

The evaluation of the EBSCs stored in the reserved memory area continues until all EBSCs have been moved to the embedded software area, or until a determination is made that there is no remaining area in the embedded software area large enough to accommodate the EBSCs of the reserved memory area. Any EBSCs that can not be accommodated in the embedded software area remain in the reserved memory area, but the embodiment is not so limited.

Upon completion of the packing and moving operations, the garbage collection API reapportions the host device memory by re-designating any unused memory blocks of the device memory as reserved memory area, at block 1010. Further, the reserved memory area pointer is reset to maintain the start address of available memory in the reserved memory area, at block 1012. Additionally, at block 1014, the garbage table is rewritten to reflect the status of the unused memory area. The upgrade client also updates the vector table following the writing of a new version of an EBSC to any memory area other than the memory area occupied by the original version of the same EBSC.

The ARM linker defines some symbols that contain the character sequence $$. These symbols and all other external names containing the sequence $$ are ARM-reserved names. The symbols are used to specify region base addresses, and input section base addresses and their limits.

These symbol addresses can be imported and used as relocatable addresses by the assembly language program, or referred to as extern symbols from C or C++ code.

$Super$$$ and $Sub$$ can be used in various situations, such as where an existing symbol cannot be modified because, for example, it is located in an external library or on ROM code.

$Super$$foo identifies a new function that will be called instead of an original function foo( ). It can be used to add processing before or after the original function.

$Sub$$ identifies the original function foo( ), and can be used to call the original function directly.

$Super$$/$Sub$$ are used to construct the vector table in one embodiment of Dynamic Addressing. As stated, the DA manager redirects inter-component function calls in order to isolate dependencies among all components. The $Super$$/$Sub$$ functionality is used in a new way to generate the vector table of the DA manager. This helps to insure that the generation of a binary image with the DA manager is reliable and practical.

Figure 11:
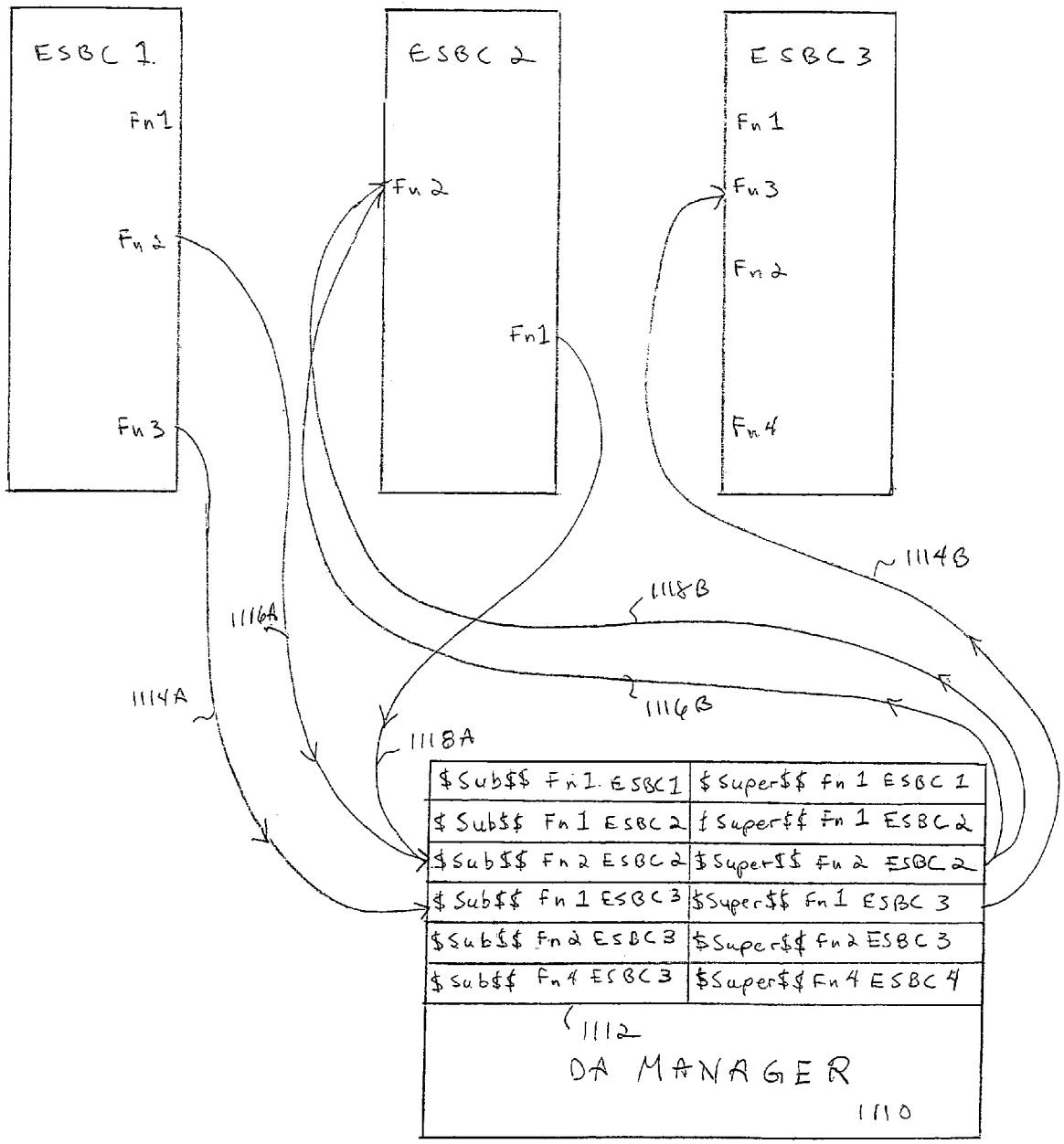
FIG. 11 is a block diagram of an embodiment of the DA Manager and vector table.

Referring to FIG. 11, according to one embodiment, the DA Manager includes the following statements:
 export $Sub$$F1Component2
 import $Super$$F1Component2

$Sub$$F1Component2
 Jump to $Super$$F1Component2

The DA manager 1110 includes the vector table 1112 constructed with the $Super$$/$Sub$$ statements as shown. When the DA Manager 1110 is linked with the ESBCs, all of the references go to the DA Manager 1110 entry specified by $Sub$$ and the DA Manager 1110 jumps to the actual code specified by $Super$$. For example, a request originates from EBSC 1, as shown in arrow 1114A. The request is a call to function 1 in ESBC 3. The call is directed to the DA Manager where $Sub$$ Fn1 ESBC3 is stored. Associated with $Sub$$ Fn1 ESBC3 is $Super$$ Fn1 ESBC3, which directs the call to the destination address of the function 1 on ESBC 3, as shown with arrow 1114B.

Regardless of where a function call originates from, the function being called determines the location in the vector table 1112 to which the call goes. For example, arrows 1116A and 1118A each depict function calls to function 2 in ESBC 2. Both calls are directed to the associates destination address of function 2 in ESBC 2 using $Super$$, as shown with arrows 1116B and 1118B.

When a location of a function changes, the vector table 1112 in the AD 1110 is updated using techniques described herein, including generating a difference file and an update file. When the location of a function changes, the contents of $Super$$ are updated for the function. The DA Manager 1110 itself is a code block, so there is no shifting of elements within the block. Therefore, the address of $Sub$$ does not change and can be relied on the direct function calls to a function's current location. The examples described with reference to FIG. 11 included function calls, but variable references including global variable references and constant variable references are also accessed through the vector table 1112 as described. The previous embodiment is described with reference to an ARM processor core or processor hosting the Arm Developer Suite (ADS) Version 1.2 software package, which includes $Super$$/$Sub$$, but the invention is not so limited. For example other suppliers, such as GNU, provide linker-defined symbols such as those designated by ARM with "$$" that supply similar functionality.

Figure 12:
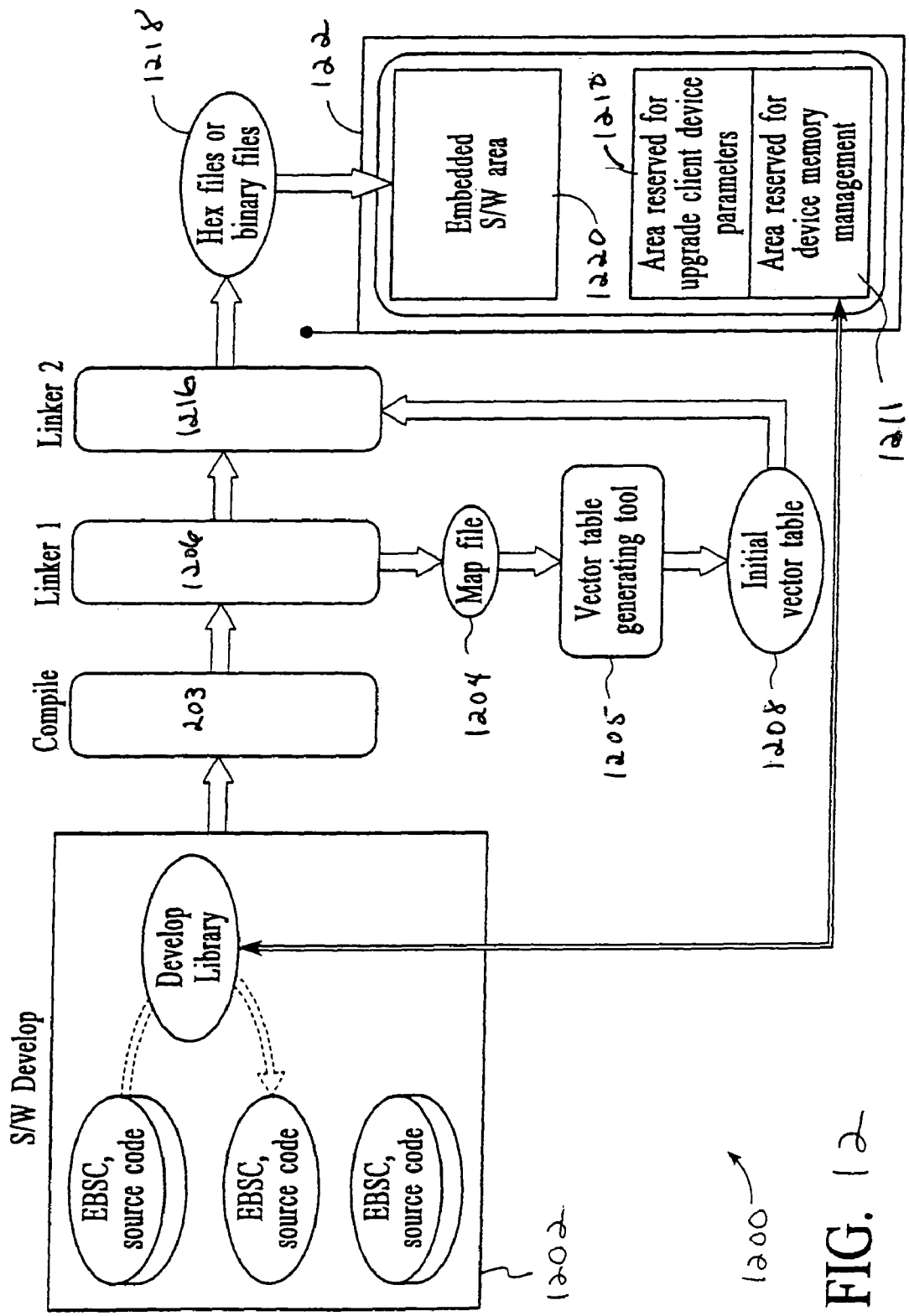
FIG. 12 is a block diagram of an embedded software development and deployment process using DA, under an embodiment.

FIG. 12 is a block diagram 1200 of an embedded software development and deployment process using DA, under an embodiment. This diagram 1200 depicts the process from EBSC development by the software component distributor 1202 to device ROM initialization using an upgrade client of an embodiment with DA-based device memory management.

Components of the software component distributor 1202 receive source code of the new EBSCs, and deliver the source code to the client device, as described above. The client device compiles 1203 the new EBSC source code. Following compiling 1203 of the source code the resulting EBSC object code transfers to a first linker 1206 which, as part of the registration of the new EBSC, generates a map file 1204 corresponding to the new EBSC.

A vector generating tool 1205 uses information of the map file 1204 to generate an initial VT 1208 corresponding to the EBSCs and transfers the VT 1208 to a second linker 1216. The second linker 1216 uses the VT 1208 along with information of the map file 1204, and information of the original image map file from the first linker 1206, to generate the hex (text) or binary file 1218.

The hex (text) or binary file 1218 is downloaded into the embedded software area 1220 of the client device 122, but alternative embodiments may write the hex file 1218 to other memory areas of the client device 122. Components of the DMM client of the client device 122 maintain the vector table 1208 during subsequent software upgrades of client device software and, as such, support dynamic addressing of EBSCs.

Referring to FIG. 4A and FIG. 4B, the operations of the flow diagrams are under control of at least one processor, but are not so limited. Each of the blocks depicted in these flow diagrams is of a type well known in the art, and can itself include a sequence of operations that need not be described herein. Those skilled in the relevant art can create source code, microcode, program logic arrays or otherwise implement the block functions based on these flow diagrams and the detailed description provided herein. The algorithm or routine operating according to these flow diagrams is stored in non-volatile memory that forms part of the associated processors, in the associated memory areas, in removable media, such as disks, or hardwired or preprogrammed in chips, such as electronically erasable programmable ROM ("EEPROM") semiconductor chips, or in any combination of these components, but is not so limited.

The components of the Centralized DA Manager described above include any collection of computing components and devices operating together. The components of the DA Manager can also be components or subsystems within a larger computer system or network. The DA Manager components can also be coupled among any number of components (not shown), for example other buses, controllers, memory devices, and data input/output (I/O) devices, in any number of combinations. Functions of the DA Manager components can be distributed among any number/combination of other processor-based components. The memory systems described above include, for example, various memory systems known in the art.

The DA and DA Manager described herein include a portable communication device comprising a dynamic addressing manager and a plurality of software components coupled to a processor, the dynamic addressing manager including one or more pairs of elements in a table, wherein each pair of elements forms an association between each identified reference in a component and another of the software components corresponding to the identified reference, the dynamic addressing manager associating the plurality of software components during execution of the code using the pairs of elements, wherein the pairs of elements include symbols defined by a linker application.

Each pair of elements of an embodiment has a fixed address in the dynamic addressing manager.

The references of an embodiment include at least one of function calls and variable references.

The variable references of an embodiment include at least one of global variable references and constant variable references.

The dynamic addressing manager of an embodiment comprises a vector table that is a centralized jump table for at least one of function calls and variable references.

Associating the plurality of software components of an embodiment comprises at least one of directing a reference from a first component to a pair of elements in an entry of the vector table, wherein the address of the pair ins included in one of the pair of elements, and redirecting the reference to a second component using information of the other of the pair of elements.

The dynamic addressing manager of an embodiment comprises at least one centralized section. The variable reference of an embodiment is assigned to the centralized section. Associating the plurality of software components of an embodiment comprises directing a reference to the variable reference to an address of the centralized section corresponding to the variable reference.

The device of an embodiment further comprises an upgrade client, the upgrade client upgrading the plurality of software components, wherein upgrading includes at least one of receiving an upgrade file via a wireless coupling, upgrading at least one of the plurality of software components as appropriate to contents of the upgrade file, and upgrading the associations among the plurality of software components by upgrading information of the associations of the dynamic addressing manager.

The device of an embodiment further comprises a memory including one or more memory areas, wherein the dynamic addressing manager is stored in the memory. The memory of an embodiment includes at least one of random access memory and read-only memory.

The client device of an embodiment is at least one of a cellular telephone, a portable computing device, and a personal digital assistant.

The DA and DA Manager described herein include a method comprising at least one of organizing code stored in a device memory of a client device into a plurality of components, identifying one or more references included in each of the plurality of components, wherein each reference is a reference to one or more other components of the code, generating a manager component that includes one or more address direction entries, wherein each address direction entry includes two fields that form a program link between each identified reference in a component and the other component corresponding to the identified reference, and linking the plurality of components using the address direction entries of the manager component during execution of the code.

Each link of an embodiment has a fixed address in the manager component.

The references of an embodiment include at least one of function calls, global variable references, and constant variable references.

The references of an embodiment include at least one of relative offset jump/branch instructions and absolute offset jump/branch instructions.

The references of an embodiment include at least one of global constant variables, global read/write data addresses, and global zero initialized data addresses.

Generating the manager component of an embodiment further comprises generating a vector table that is a centralized jump table for at least one of function calls and global variables. Linking the plurality of components of an embodiment further comprises at least one of directing a reference from a first component to an entry of the vector table using a first field of an entry, and redirecting the reference to a second component using a second field of the entry. The reference of an embodiment includes at least one of a function call and a variable.

Generating the manager component of an embodiment further comprises at least one of generating at least one centralized section of the manager component and assigning global constant variables to the generated centralized section. Linking the plurality of components of an embodiment further comprises directing a reference to the global constant variable to an address of the centralized section corresponding to the global constant variable. Generating the manager component of an embodiment may further comprise assigning global read/write data addresses to the generated centralized section. Linking the plurality of components of an embodiment may further comprise directing a reference to the global read/write data addresses to an address of the centralized section corresponding to the global read/write data addresses. Generating the manager component of an embodiment may also further comprise assigning global zero initialized data addresses to the generated centralized section. Linking the plurality of components of an embodiment may also further comprise directing a reference to the global zero initialized data addresses to an address of the centralized section corresponding to the global zero initialized data addresses.

The method of an embodiment further comprises storing the manager component in one or more memory areas of the client device. The memory areas of an embodiment include areas in at least one of random access memory and read-only memory.

The method of an embodiment further comprises upgrading the code, the upgrading including at least one of receiving an upgrade file via a wireless coupling, upgrading at least one of the plurality of components as appropriate to contents of the upgrade file, and upgrading the linking among the plurality of components of the upgraded code by upgrading the manager component.

The client device of an embodiment is at least one of a cellular telephone, a portable computing device, and a personal digital assistant.

The DA and DA Manager described herein include a system comprising at least one of a first device including a first upgrade component that generates upgrade files, wherein the upgrade files include at least one of information to repair errors in electronic files and information to add functionality to the electronic files, and a mobile communication device comprising a second upgrade component, a dynamic addressing manager, and a plurality of software components, the dynamic addressing manager including one or more links, wherein each link forms a program link between each identified reference in a component and another of the software components corresponding to the identified reference, the dynamic addressing manager linking the plurality of software components during execution of the code using the links, and wherein the links comprise one or more linker-defined symbols.

The system of an embodiment further comprises a wireless coupling, wherein the second upgrade component receives the upgrade files via the wireless coupling, the second upgrade component automatically upgrading the plurality of software components using information of the upgrade files. The upgrading of an embodiment comprises upgrading at least one of the plurality of software components as appropriate to contents of the upgrade file and upgrading the links among the plurality of software components by upgrading information of the links of the dynamic addressing manager.

The system of an embodiment includes links having a fixed address in the dynamic addressing manager.

The references of the system of an embodiment include at least one of function calls and variable references.

The dynamic addressing manager of the system of an embodiment comprises a vector table that is a centralized jump table for at least one of function calls and variable references.

The dynamic addressing manager of the system of an embodiment comprises at least one centralized section, wherein at least one variable reference is assigned to the centralized section.

The first device of the system of an embodiment is a processor-based device accessible by at least one provider of software components hosted on the second device.

The mobile communication device of the system of an embodiment includes at least one of cellular telephones, portable computing devices, and personal digital assistants.

The plurality of software components of an embodiment comprise software files including dynamic link library files, shared object files, embedded software components (EBSCs), firmware files, executable files, data files including hex data files, system configuration files, and files including personal use data.

The DA and DA Manager described herein include a mobile communication device comprising at least one of means for organizing code stored in a device memory of a client device into a plurality of components, means for identifying one or more references included in each of the plurality of components, wherein each reference is a reference to one or more other components of the code, means for generating a manager component that includes one or more links, wherein each link forms a program link between each identified reference in a component and the other component corresponding to the identified reference, and means for linking the plurality of components using the links of the manager component during execution of the code, and wherein the links comprise one or more linker-defined symbols.

The means for generating the manager component of the device of an embodiment further comprises means for generating a vector table that is a centralized jump table for at least one of function calls and global variables. The means for linking the plurality of components of the device of an embodiment further comprises at least one of means for directing a reference from a first component to an entry of the vector table and means for redirecting the reference to a second component using information of the entry.

The means for generating the manager component of the device of an embodiment further comprises at least one of means for generating at least one centralized section of the manager component and means for assigning variable references to the generated centralized section. The means for linking the plurality of components of the device of an embodiment may further comprise means for directing a reference to the variable reference to an address of the centralized section corresponding to the variable reference.

The device of an embodiment further comprises means for upgrading the code, including at least one of means for receiving an upgrade file via a wireless coupling, means for upgrading at least one of the plurality of components as appropriate to contents of the upgrade file, and means for upgrading the linking among the plurality of components of the upgraded code by upgrading the manager component.

The DA and DA Manager described herein include a machine-readable medium including executable instructions which, when executed in a processing system, link software components in a portable device by organizing code stored in a device memory of a client device into a plurality of components, identifying one or more references included in each of the plurality of components, wherein each reference is a reference to one or more other components of the code, generating a manager component that includes one or more links, wherein each link forms a program link between each identified reference in a component and the other component corresponding to the identified reference, and/or linking the plurality of components using the links of the manager component during execution of the code, and wherein the links comprise one or more linker-defined symbols.

The medium of an embodiment further comprises upgrading the code by receiving an upgrade file via a wireless coupling, upgrading at least one of the plurality of components as appropriate to contents of the upgrade file, and/or upgrading the linking among the plurality of components of the upgraded code by upgrading the manager component.

Aspects of the Centralized DA Manager described herein may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects of the DA Manager include: microcontrollers with memory (such as EEPROM), embedded microprocessors, firmware, software, etc. Furthermore, aspects of the DA Manager may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, etc.

It should be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the DA Manager is not intended to be exhaustive or to limit the DA Manager to the precise form disclosed. While specific embodiments of, and examples for, the DA Manager are described herein for illustrative purposes, various equivalent modifications are possible within the scope of the DA Manager, as those skilled in the relevant art will recognize. The teachings of the DA Manager provided herein can be applied to other processing systems and methods, not only for the memory systems and methods described above.

The elements and acts of the various embodiments described above can be combined to provide further embodiments. These and other changes can be made to the DA Manager in light of the above detailed description.

In general, in the following claims, the terms used should not be construed to limit the DA Manager to the specific embodiments disclosed in the specification and the claims, but should be construed to include all processing systems that operate under the claims. Accordingly, the DA Manager is not limited by the disclosure, but instead the scope of the DA Manager is to be determined entirely by the claims.

While certain aspects of the DA Manager are presented below in certain claim forms, the inventors contemplate the various aspects of the DA Manager in any number of claim forms. For example, while only one aspect of the DA Manager is recited as embodied in machine-readable medium, other aspects may likewise be embodied in machine-readable medium. Accordingly, the inventors reserve the right to add additional claims after filing the application to pursue such additional claim forms for other aspects of the DA Manager.

All of the patent applications references herein by serial number are hereby incorporated by reference in their entirety in this patent application.

What is claimed is:

1. A portable communication device comprising:
a device processor;

an upgrade client that automatically detects a remote change of any embedded software components; and a dynamic addressing manager associated with a plurality of software components and coupled to the device processor, the dynamic addressing manager stored in device memory and including one or more pairs of elements in a table including statements corresponding to associations between the plurality of software components which include an update corresponding to a change to a location of a function of an embedded software component, wherein each of the pairs of elements forms an association between each identified reference in a component and another of the software components corresponding to the identified reference, the dynamic addressing manager associating the plurality of software components during execution of the code using the pairs of elements including changes to software component associations, wherein the pairs of elements include symbols defined by a linker application, the dynamic addressing manager to receive requests including function call requests from the plurality of software components and use the statements to direct a function call from one embedded software component to a called function of another embedded software component and use information of the remote change to update information of one or more of the pair of elements that include a first statement identifying an original function and an associated embedded software component and a second statement identifying a new function and an associated embedded software component as part of managing associations between the embedded software components using the remote change information, the dynamic addressing manager to rout references to and from the embedded software components instead of directly between the embedded software components during execution of the code.

2. The device of claim 1, wherein each pair of elements has a fixed address in the dynamic addressing manager.

3. The device of claim 1, wherein the references include at least one of function calls and variable references.

4. The device of claim 3, wherein the variable references include at least one of global variable references and constant variable references.

5. The device of claim 1, wherein the table comprises a vector table that is a centralized jump table for at least one of function calls and variable references.

6. The device of claim 5, wherein associating the plurality of software components comprises:
directing a reference from a first component to a pair of elements in an entry of the vector table, wherein the address of the pair is included in one of the pair of elements; and
redirecting the reference to a second component using information of the other of the pair of elements.

7. The device of claim 1, wherein the dynamic addressing manager comprises at least one centralized section.

8. The device of claim 7, wherein at least one variable reference is assigned to the centralized section.

9. The device of claim 8, wherein linking the plurality of software components comprises directing a reference to the variable reference to an address of the centralized section corresponding to the variable reference.

10. The device of claim 1, the upgrade client upgrading the plurality of software components, wherein upgrading includes:
receiving an upgrade file via a wireless coupling;
upgrading at least one of the plurality of software components as appropriate to contents of the upgrade file; and
upgrading the associations among the plurality of software components by upgrading information of the associations of the dynamic addressing manager.

11. The device of claim 1, further comprising a memory including one or more memory areas, wherein the dynamic addressing manager is stored in the memory.

12. The device of claim 11, wherein the memory includes at least one of random access memory and read-only memory.

13. The device of claim 1, wherein the client device is at least one of a cellular telephone, a portable computing device, and a personal digital assistant.

14. A method comprising:
using a device processor and:
organizing code stored in a device memory of a client device into a plurality of components;
automatically detecting a remote Chan e of any embedded components;
identifying one or more references included in each of the plurality of components, wherein each reference is a reference to one or more other components of the code;
generating a dynamic addressing manager component that includes one or more address direction entries including changes to reference links, wherein each of the address direction entries includes two fields that form a program link between each identified reference in a component and the other component corresponding to the identified reference including statements corresponding to associations between the plurality of components which include an update corresponding to a change to a location of a function of an embedded component,
using the dynamic addressing manager component to receive requests including function call requests from the plurality of components and use the statements to direct a function call from one embedded component to a called function of another embedded component including using information of the remote change to update information of one or more of the address direction entries that include a first statement identifying an original function and an associated embedded component and a second statement identifying a new function and an associated embedded component as part of managing associations between the embedded components using the remote change information, the dynamic addressing manager component to rout references to and from the embedded components instead of directly between the embedded components during execution of the code; and
linking the plurality of components using the address direction entries of the dynamic addressing manager component during execution of the code.

15. The method of claim 14, wherein each address direction entry has a fixed address in the dynamic addressing manager component.

16. The method of claim 14, wherein the references include at least one of function calls, global variable references, and constant variable references.

17. The method of claim 14, wherein the references include at least one of relative offset jump/branch instructions and absolute offset jump/branch instructions.

18. The method of claim 14, wherein the references include at least one of global constant variables, global read/write data addresses, and global zero initialized data addresses.

19. The method of claim 14, wherein generating the dynamic addressing manager component further comprises generating a vector table that stores the one or more address direction entries and that is a centralized jump table for at least one of function calls and global variables.

20. The method of claim 19, wherein linking the plurality of components further comprises:
directing a reference from a first component to an entry of the vector table using a first field of an entry; and
redirecting the reference to a second component using a second field of the entry.

21. The method of claim 19, wherein the reference includes at least one of a function call and a variable.

22. The method of claim 14, wherein generating the dynamic addressing manager component further comprises:
generating at least one centralized section of the dynamic addressing manager component; and
assigning global constant variables to the generated centralized section.

23. The method of claim 22, wherein linking the plurality of components further comprises directing a reference to the global constant variable to an address of the centralized section corresponding to the global constant variable.

24. The method of claim 22, wherein generating the dynamic addressing manager component further comprises assigning global read/write data addresses to the generated centralized section.

25. The method of claim 24, wherein linking the plurality of components further comprises directing a reference to the global read/write data addresses to an address of the centralized section corresponding to the global read/write data addresses.

26. The method of claim 22, wherein generating the dynamic addressing manager component further comprises assigning global zero initialized data addresses to the generated centralized section.

27. The method of claim 26, wherein linking the plurality of components further comprises directing a reference to the global zero initialized data addresses to an address of the centralized section corresponding to the global zero initialized data addresses.

28. The method of claim 14, further comprising storing the dynamic addressing manager component in one or more memory areas of the client device.

29. The method of claim 28, wherein the memory areas include areas in at least one of random access memory and read-only memory.

30. The method of claim 14, further comprising upgrading the code, the upgrading including:
receiving an upgrade file via a wireless coupling;
upgrading at least one of the plurality of components as appropriate to contents of the upgrade file; and
upgrading the linking among the plurality of components of the upgraded code by upgrading the dynamic addressing manager component.

31. The method of claim 14, wherein the client device is at least one of a cellular telephone, a portable computing device, and a personal digital assistant.

32. A system comprising:
a first device including a first upgrade component that generates upgrade files, wherein the upgrade files include at least one of information to repair errors in electronic files and information to add functionality to the electronic files and automatically detects a remote change of any embedded components; and
a mobile communication device comprising a second upgrade component, a dynamic addressing manager, and a plurality of software components, the dynamic addressing manager including one or more links and statements corresponding to associations between the plurality of software components which include an update corresponding to a change to a location of a function of an embedded software component, wherein each link forms a program link between each identified reference in a component and another of the software components corresponding to the identified reference, the dynamic addressing manager linking the plurality of software components during execution of the code using the links and including changes to reference links, and wherein the links comprise one or more linker-defined symbols,
the dynamic addressing manager to receive requests including function call requests from the plurality of software components and use the statements to direct a function call from one embedded software component to a called function of another embedded software component and use information of the remote change to update information of one or more of the statements that include a first statement identifying an original function and an associated embedded software component and a second statement identifying a new function and an associated embedded software component as part of managing associations between the embedded software components using the remote change information, the dynamic addressing manager to rout references to and from the embedded software components instead of directly between the embedded software components during execution of the code.

33. The system of claim 32, further comprising a wireless coupling, wherein the second upgrade component receives the upgrade files via the wireless coupling, the second upgrade component automatically upgrading the plurality of software components using information of the upgrade files.

34. The system of claim 33, wherein upgrading comprises upgrading at least one of the plurality of software components as appropriate to contents of the upgrade file and upgrading the links among the plurality of software components by upgrading information of the links of the dynamic addressing manager.

35. The system of claim 32, wherein each link has a fixed address in the dynamic addressing manager.

36. The system of claim 32, wherein the references include at least one of function calls and variable references.

37. The system of claim 32, wherein the dynamic addressing manager comprises a vector table that is a centralized jump table for at least one of function calls and variable references.

38. The system of claim 32, wherein the dynamic addressing manager comprises at least one centralized section, wherein at least one variable reference is assigned to the centralized section.

39. The system of claim 32, wherein the first device is a processor-based device accessible by at least one provider of software components hosted on the second device.

40. The system of claim 32, wherein the mobile communication device includes at least one of cellular telephones, portable computing devices, and personal digital assistants.

41. The system of claim 32, wherein the plurality of software components comprise software files including dynamic link library files, shared object files, embedded software components (EBSCs), firmware files, executable files, data files including hex data files, system configuration files, and files including personal use data.

42. A mobile communication device comprising:
means for organizing code stored in a device memory of a client device into a plurality of components;

means for automatically detecting a remote change of any embedded components;

means for identifying one or more references included in each of the plurality of components including statements corresponding to associations between the plurality of components which include an update corresponding to a change to a location of a function of an embedded component, wherein each reference is a reference to one or more other components of the code;

means for generating a dynamic addressing manager component that includes one or more links including changes to reference links, wherein each link forms a program link between each identified reference in a component and the other component corresponding to the identified reference, the dynamic addressing manager component to receive requests including function call requests from the plurality of components and use the statements to direct a function call from one embedded software component to a called function of another embedded software component including using information of the remote change to update information of one or more of the statements that include a first statement identifying an original function and an associated embedded software component and a second statement identifying a new function and an associated embedded software component as part of managing associations between the embedded software components using the remote change information, the dynamic addressing manager component to rout references to and from the embedded software components instead of directly between the embedded software components during execution of the code; and means for linking the plurality of components using the links of the dynamic addressing manager component during execution of the code, wherein the links include one or more linker-defined symbols.

43. The device of claim 42, wherein the means for generating the dynamic addressing manager component further comprises means for generating a vector table that is a centralized jump table for at least one of function calls and global variables.

44. The device of claim 43, wherein the means for linking the plurality of components further comprises:
means for directing a reference from a first component to an entry of the vector table; and
means for redirecting the reference to a second component using information of the entry.

45. The device of claim 42, wherein the means for generating the dynamic addressing manager component further comprises:
means for generating at least one centralized section of the dynamic addressing manager component; and
means for assigning variable references to the generated centralized section.

46. The device of claim 45, wherein means for linking the plurality of components further comprises means for directing a reference to the variable reference to an address of the centralized section corresponding to the variable reference.

47. The device of claim 42, further comprising means for upgrading the code, including:
means for receiving an upgrade file via a wireless coupling;
means for upgrading at least one of the plurality of components as appropriate to contents of the upgrade file; and
means for upgrading the linking among the plurality of components of the upgraded code by upgrading the dynamic addressing manager component.

48. A non-transitory computer-readable medium including executable instructions which, when executed in a processing system, link software components in a portable device by:
organizing code stored in a device memory of a client device into a plurality of components;
automatically detecting a remote change of any embedded components; identifying one or more references included in each of the plurality of components, wherein each reference is a reference to one or more other components of the code;
generating a dynamic addressing manager component that includes one or more links including changes to reference links, wherein each link forms a program link between each identified reference in a component and the other component corresponding to the identified reference including statements corresponding to associations between the plurality of components which include an update corresponding to a change to a location of a function of an embedded component,
using the dynamic addressing manager component to receive requests including function call requests from the plurality of components and use the statements to direct a function call from one embedded component to a called function of another embedded component and use information of the remote change to update information of one or more of the statements that include a first statement identifying an original function and an associated embedded component and a second statement identifying a new function and an associated embedded component as part of managing associations between the embedded components using the remote change information, the dynamic addressing manager component to rout references to and from the embedded components instead of directly between the embedded components during execution of the code; and
linking the plurality of components using the links of the dynamic addressing manager component during execution of the code, wherein the links include a plurality of linker-defined symbols.

49. The medium of claim 48, further comprising upgrading the code by:
receiving an upgrade file via a wireless coupling;
upgrading at least one of the plurality of components as appropriate to contents of the upgrade file; and
upgrading the linking among the plurality of components of the upgraded code by upgrading the dynamic addressing manager component.

* * * * *